US010225462B2

(12) United States Patent
Murakami et al.

(10) Patent No.: US 10,225,462 B2
(45) Date of Patent: Mar. 5, 2019

(54) IMAGE PROCESSING TO TRACK FACE REGION OF PERSON

(71) Applicant: SONY CORPORATION, Tokyo (JP)

(72) Inventors: Tadasuke Murakami, Tokyo (JP); Akira Tokuse, Tokyo (JP); Takashi Tsujimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 14/352,195

(22) PCT Filed: Jan. 28, 2013

(86) PCT No.: PCT/JP2013/000428
§ 371 (c)(1),
(2) Date: Apr. 16, 2014

(87) PCT Pub. No.: WO2013/118450
PCT Pub. Date: Aug. 15, 2013

(65) Prior Publication Data
US 2014/0247374 A1    Sep. 4, 2014

(30) Foreign Application Priority Data

Feb. 6, 2012 (JP) ................................. 2012-022679

(51) Int. Cl.
*H04N 5/228* (2006.01)
*H04N 5/232* (2006.01)
*G06K 9/00* (2006.01)

(52) U.S. Cl.
CPC ..... *H04N 5/23219* (2013.01); *G06K 9/00228* (2013.01); *H04N 5/23293* (2013.01)

(58) Field of Classification Search
CPC .................................... H04N 5/23219
USPC ........................................ 348/222.1
See application file for complete search history.

(56) References Cited

U.S. PATENT DOCUMENTS

| 7,355,627 B2 * | 4/2008 | Yamazaki ............. H04N 7/188 348/143 |
| 7,440,593 B1 | 10/2008 | Steinberg et al. |
| 2008/0013799 A1 | 1/2008 | Steinberg et al. |
| 2008/0013800 A1 | 1/2008 | Steinberg et al. |

(Continued)

FOREIGN PATENT DOCUMENTS

| CN | 101202841 A | 6/2008 |
| CN | 101453605 A | 6/2009 |

(Continued)

OTHER PUBLICATIONS

International Search Report dated Apr. 3, 2013 in PCT/JP2013/000428.

(Continued)

*Primary Examiner* — Anthony J Daniels
(74) *Attorney, Agent, or Firm* — Chip Law Group

(57) ABSTRACT

An image processing system includes a face detection unit to detect a face in an image and a partial region detection unit to detect a partial region of the image based on a position of the face detected in the image. A tracking determination unit may also be included in the image processing system to select at least one of the face and the partial region for tracking based on a predetermined condition, and to track the selected one of the face and the partial region.

16 Claims, 25 Drawing Sheets

(56) References Cited

U.S. PATENT DOCUMENTS

| | | | | |
|---|---|---|---|---|
| 2008/0074536 | A1* | 3/2008 | Tamura | H04N 5/2351 348/371 |
| 2008/0316327 | A1* | 12/2008 | Steinberg | G06K 9/00248 348/222.1 |
| 2009/0003708 | A1* | 1/2009 | Steinberg | G06T 7/0081 382/190 |
| 2009/0190023 | A1* | 7/2009 | Mise | G03B 13/00 348/345 |
| 2009/0304238 | A1* | 12/2009 | Ebata | G06K 9/00288 382/118 |
| 2009/0316022 | A1* | 12/2009 | Hatano | H04N 1/401 348/240.99 |
| 2010/0086175 | A1 | 4/2010 | Yokono et al. | |
| 2010/0188521 | A1* | 7/2010 | Minagawa | H04N 5/232 348/222.1 |
| 2010/0208127 | A1* | 8/2010 | Takada | G02B 7/28 348/349 |
| 2010/0220899 | A1 | 9/2010 | Steinberg et al. | |
| 2010/0259647 | A1* | 10/2010 | Gann | G06T 11/60 348/239 |
| 2011/0007187 | A1* | 1/2011 | Mori | G06T 7/0042 348/239 |
| 2011/0019021 | A1 | 1/2011 | Yoshizumi | |
| 2011/0019027 | A1* | 1/2011 | Fujita | G06T 7/20 348/222.1 |
| 2011/0243451 | A1* | 10/2011 | Oyaizu | G06T 5/50 382/190 |
| 2012/0075504 | A1 | 3/2012 | Steinberg et al. | |
| 2012/0155709 | A1 | 6/2012 | Steinberg et al. | |
| 2013/0011049 | A1 | 1/2013 | Kimura | |
| 2013/0027579 | A1 | 1/2013 | Kinoshita et al. | |

FOREIGN PATENT DOCUMENTS

| | | | |
|---|---|---|---|
| JP | 2004-283959 | A | 10/2004 |
| JP | 2007-042072 | A | 2/2007 |
| JP | 2007-180850 | A | 7/2007 |
| JP | 2009-048347 | A | 3/2009 |
| JP | 2009-124586 | A | 6/2009 |
| JP | 2010-113129 | A | 5/2010 |
| JP | 2011-166305 | A | 8/2011 |
| JP | 2013-012941 | A | 1/2013 |
| WO | WO 2011/111371 | A1 | 9/2011 |
| WO | WO 2011/121917 | A1 | 10/2011 |
| WO | WO 2011/122333 | A1 | 10/2011 |

OTHER PUBLICATIONS

Office Action received for Japanese Patent Application No. 2012-022679 dated Dec. 8, 2015.

Office Action received for Japanese Patent Application No. 2012-022679, dated Apr. 26, 2016, 7 pages.

Office Action for CN Patent Application No. 201380007191.8, dated Dec. 27, 2016, 10 pages of Office Action and 14 pages of English Translation.

* cited by examiner

[Fig. 1]
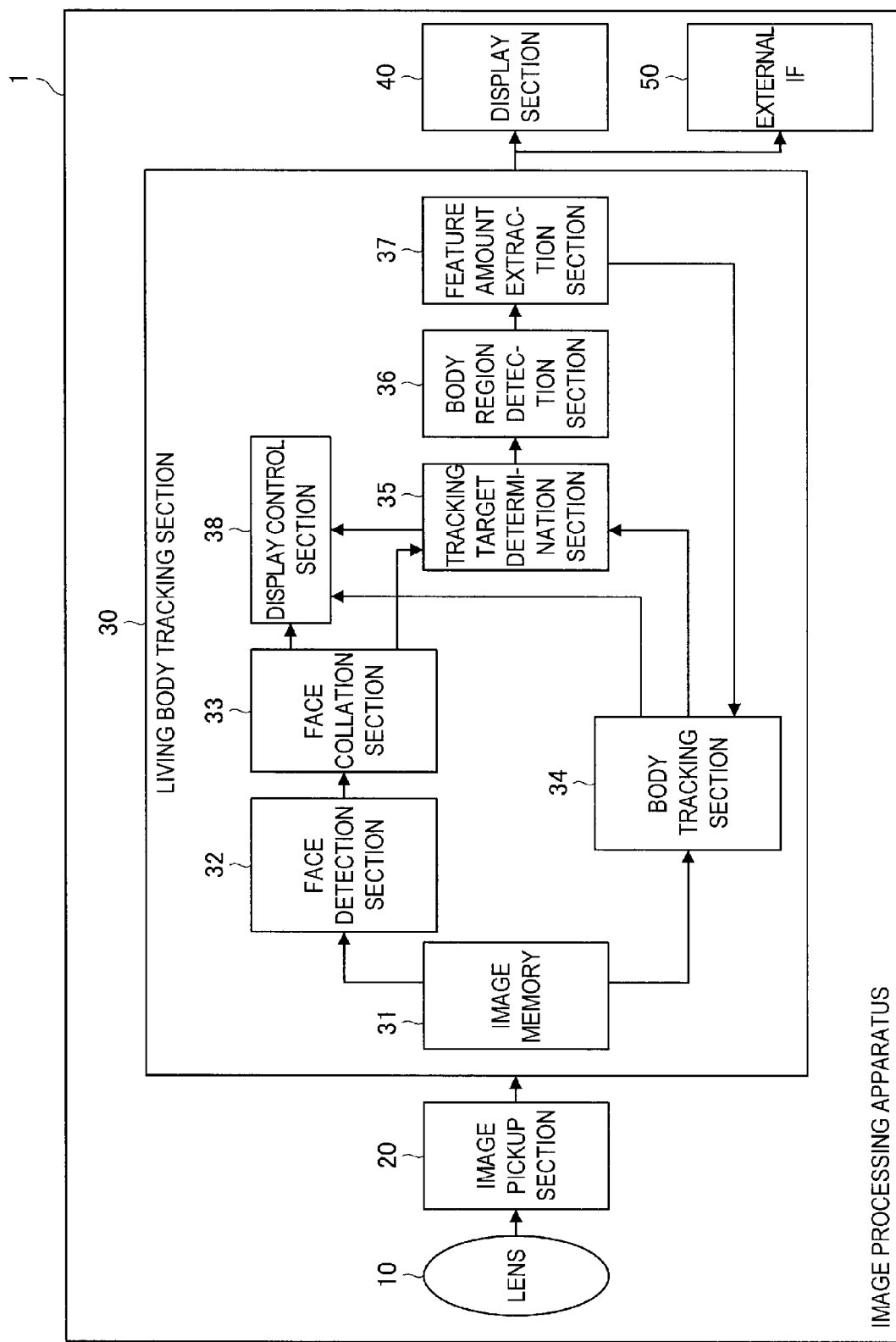

[Fig. 2]
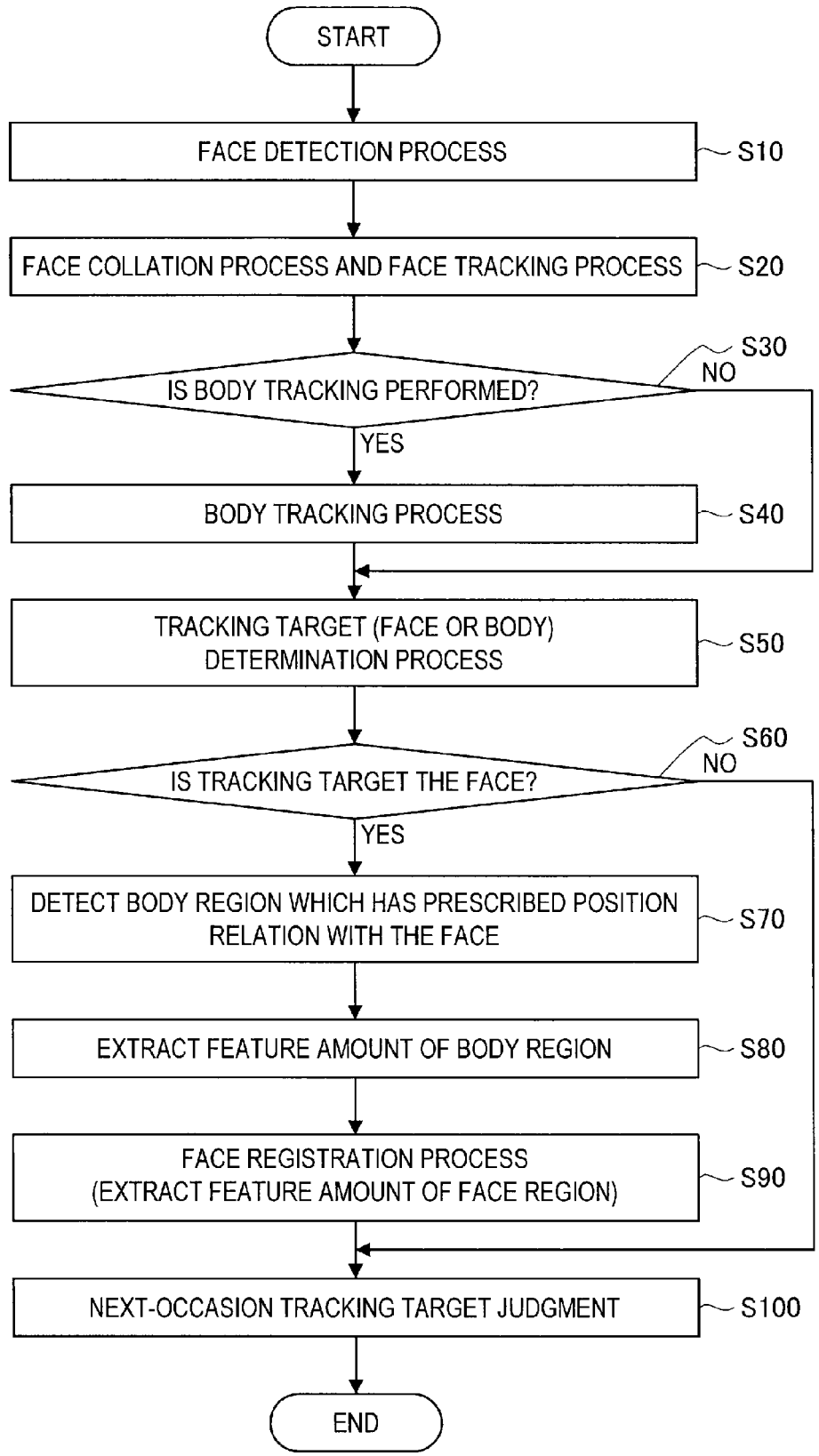

[Fig. 3]
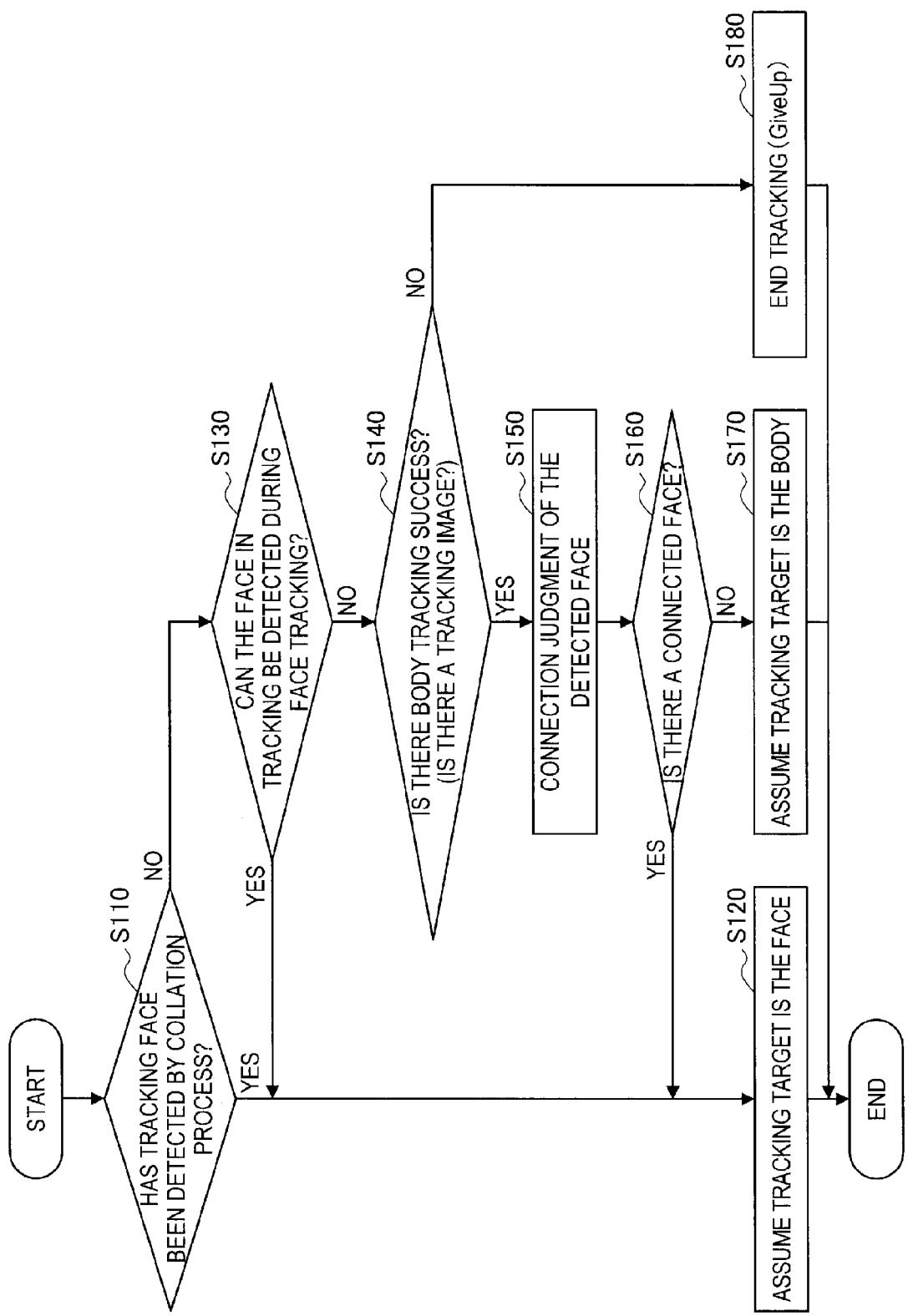

[Fig. 4]
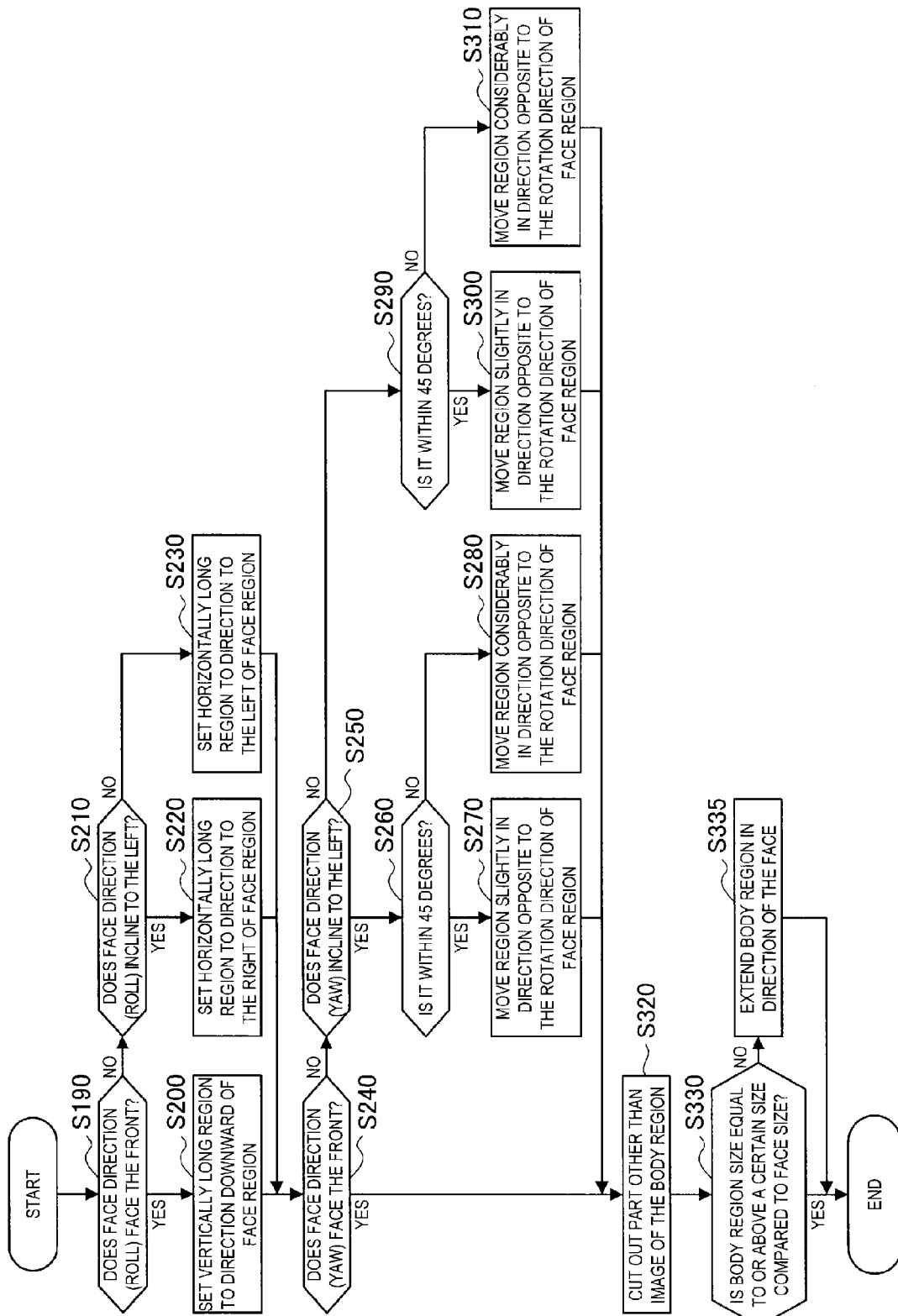

[Fig. 5]
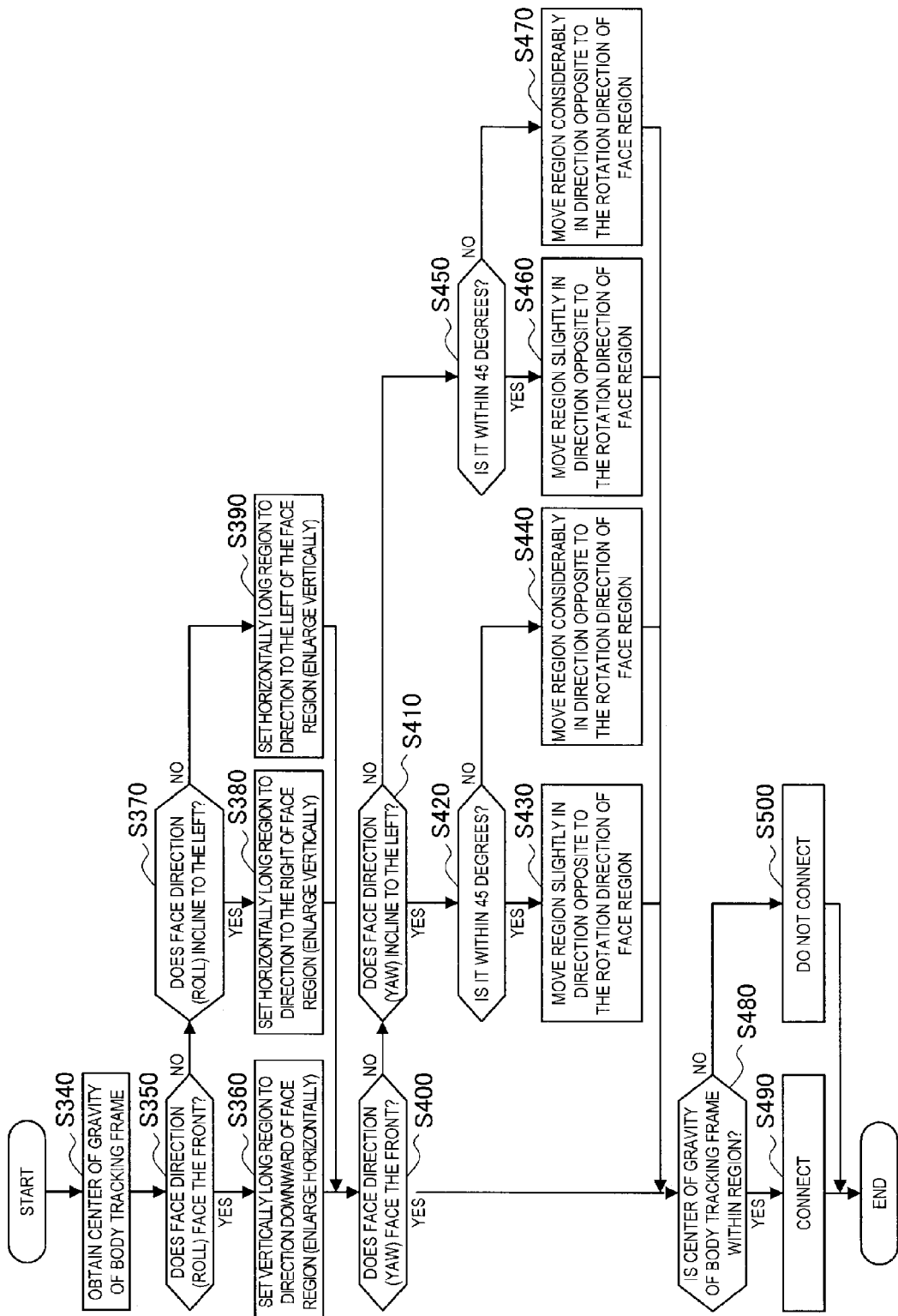

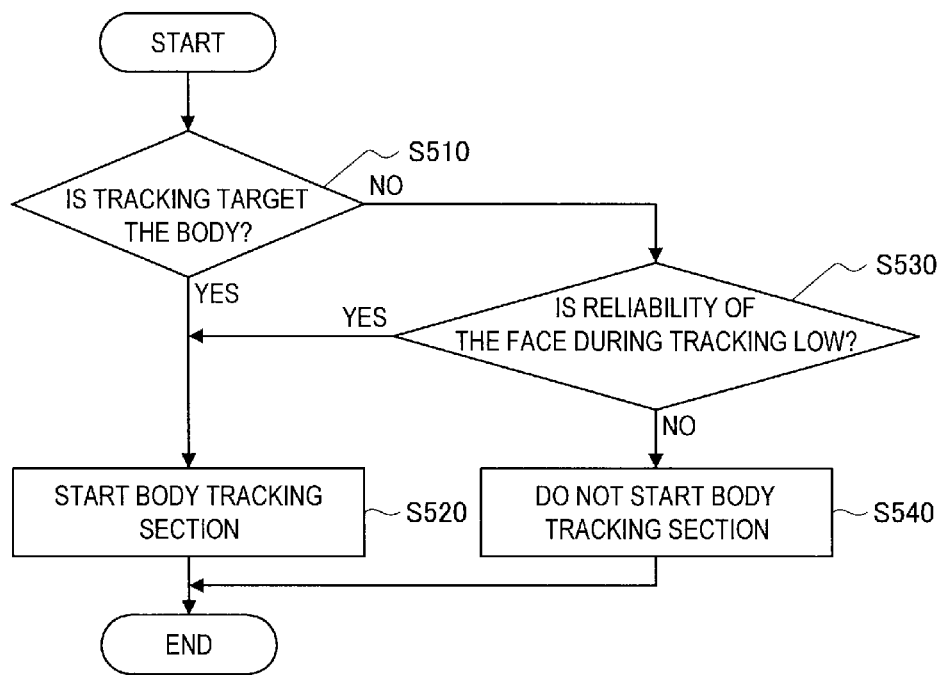
[Fig. 6]

[Fig. 7]
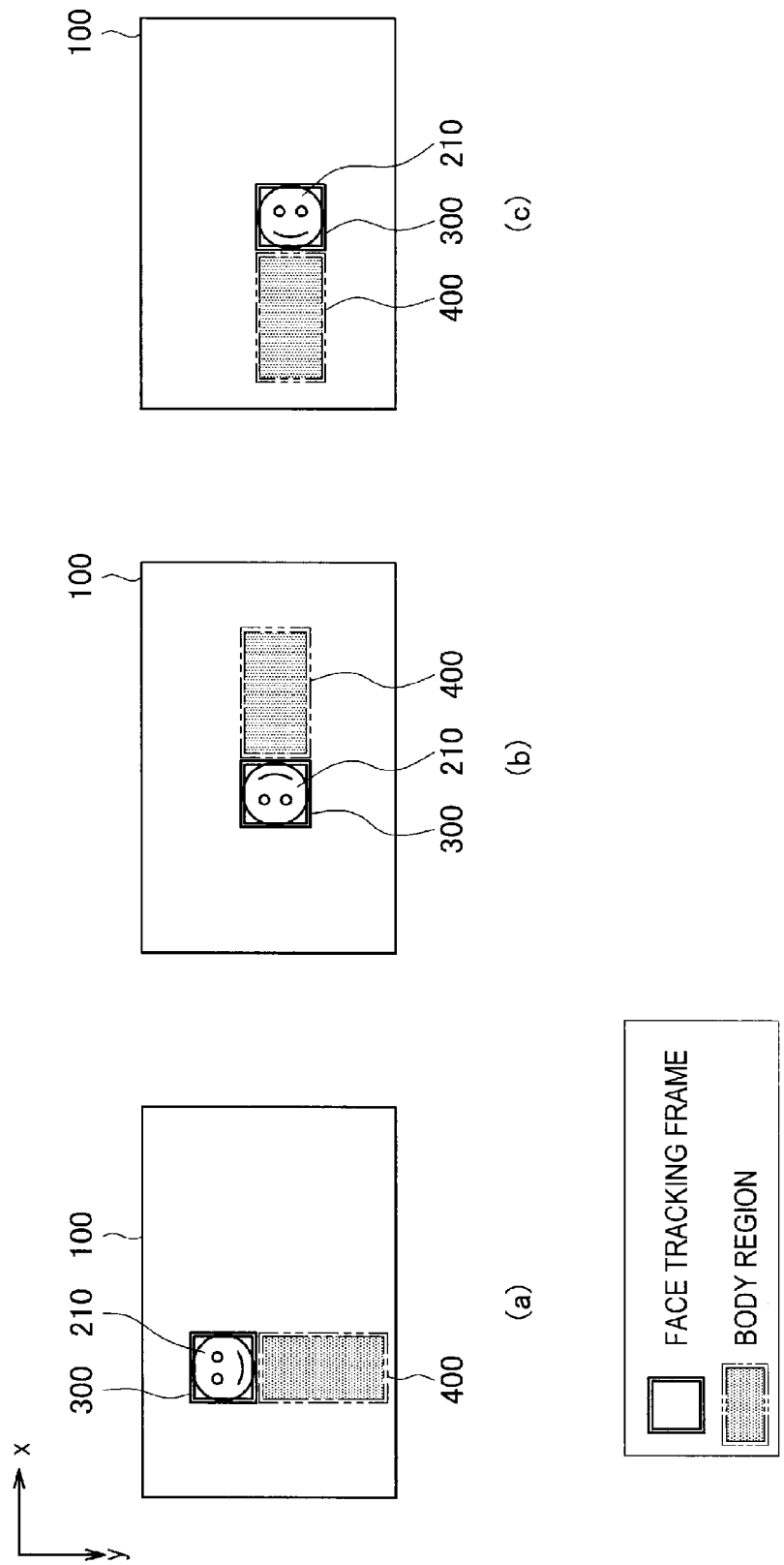

[Fig. 8]
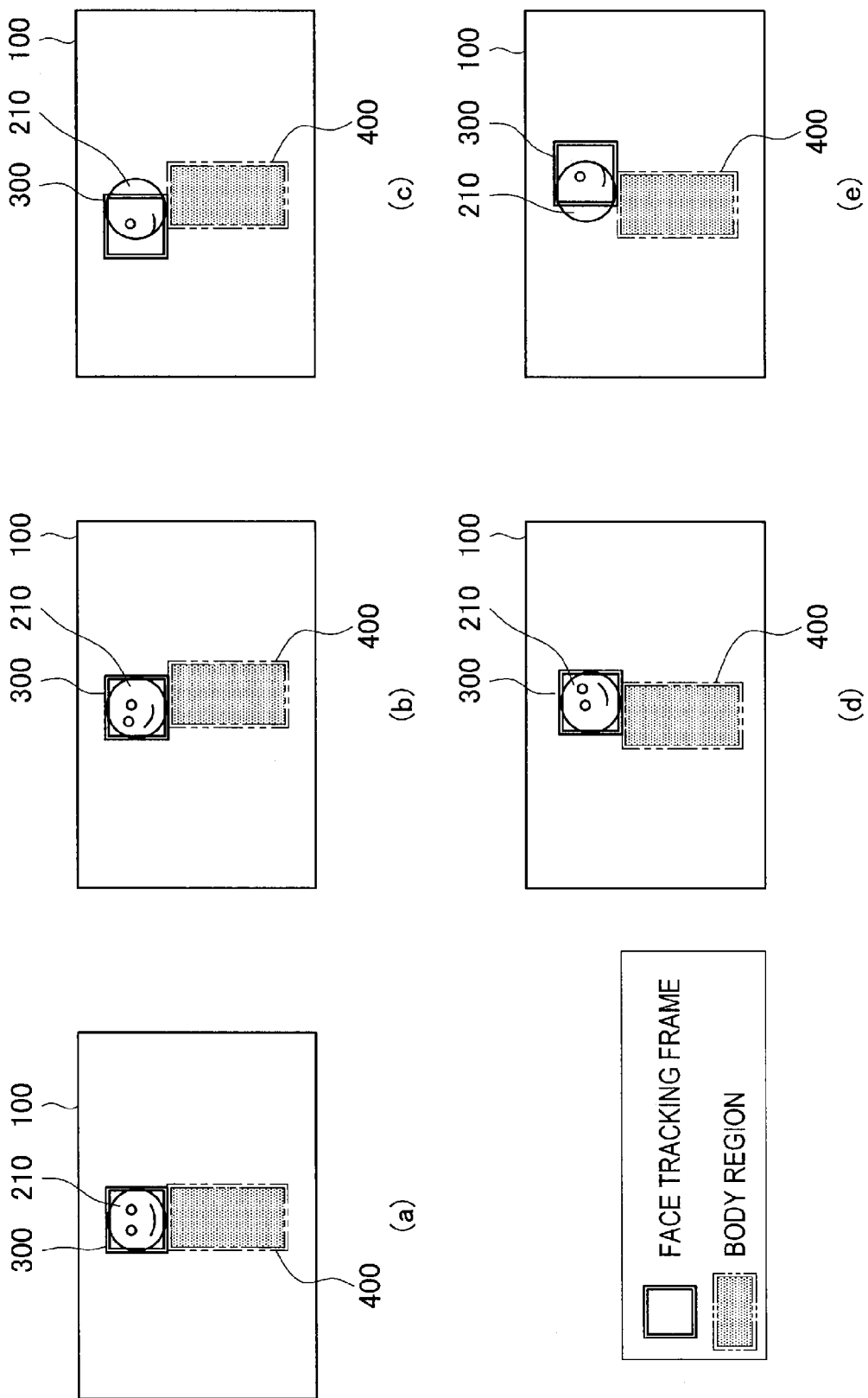

[Fig. 9]
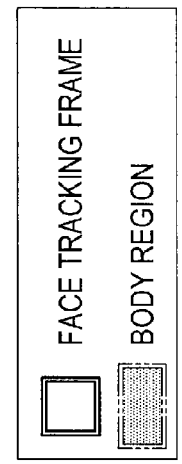
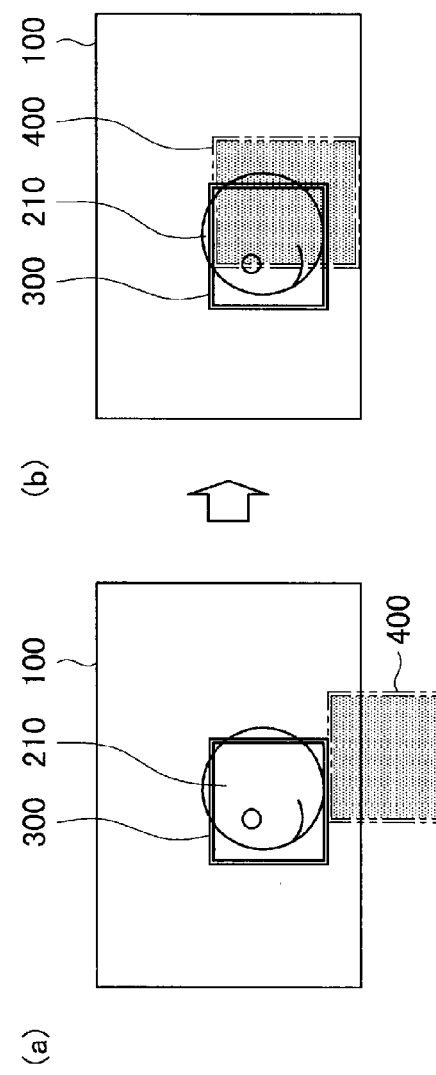

[Fig. 10]
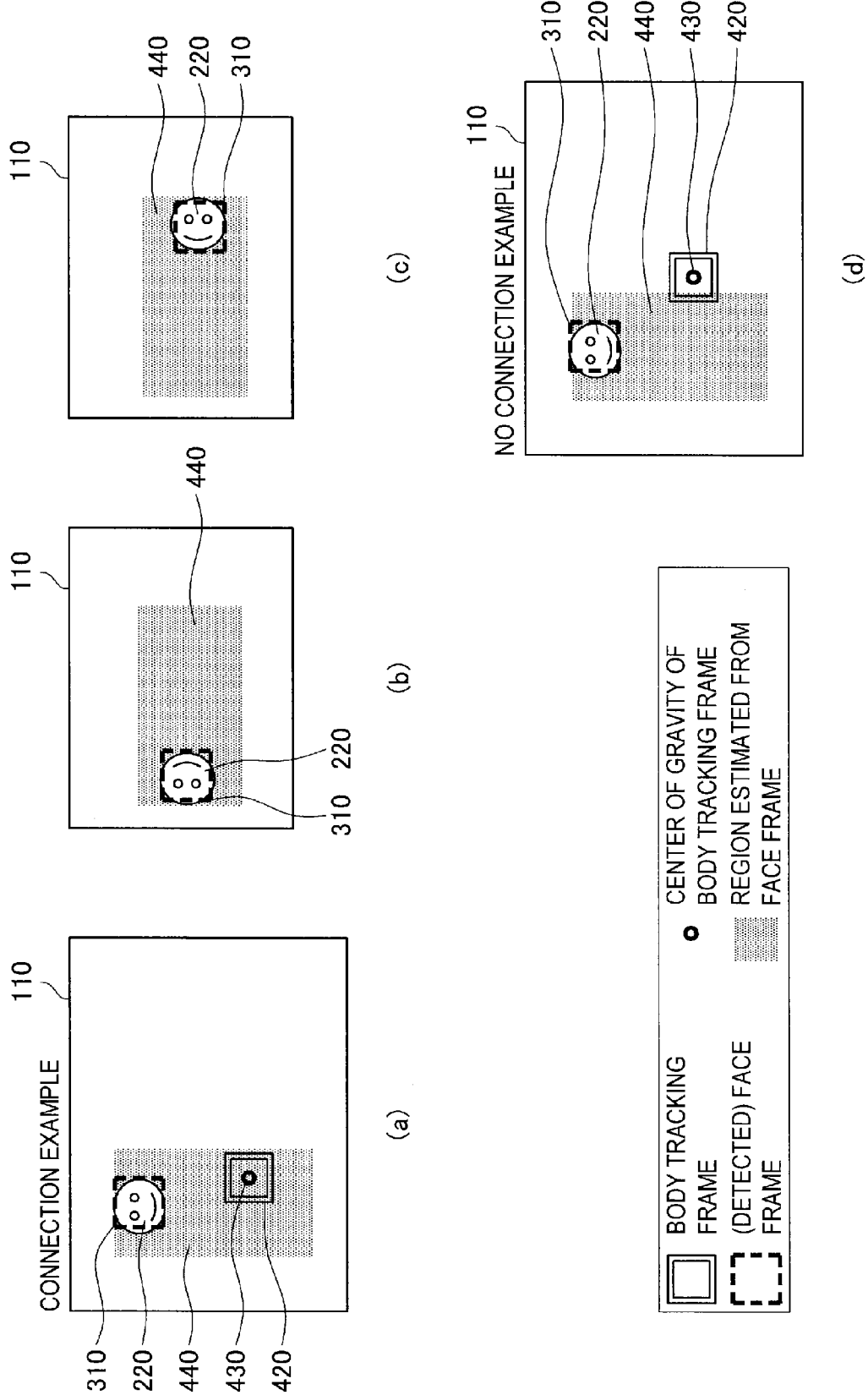

[Fig. 11]
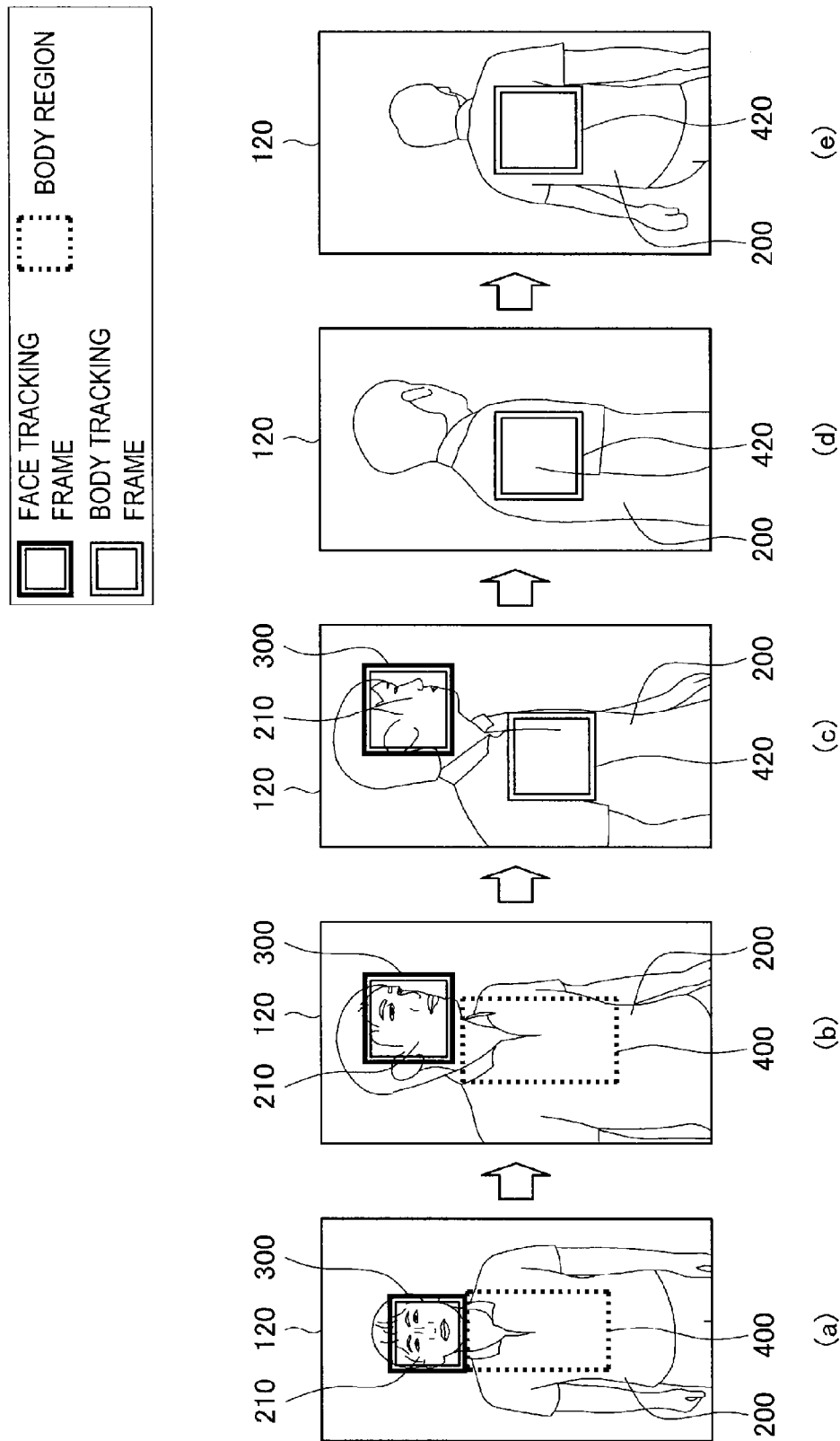

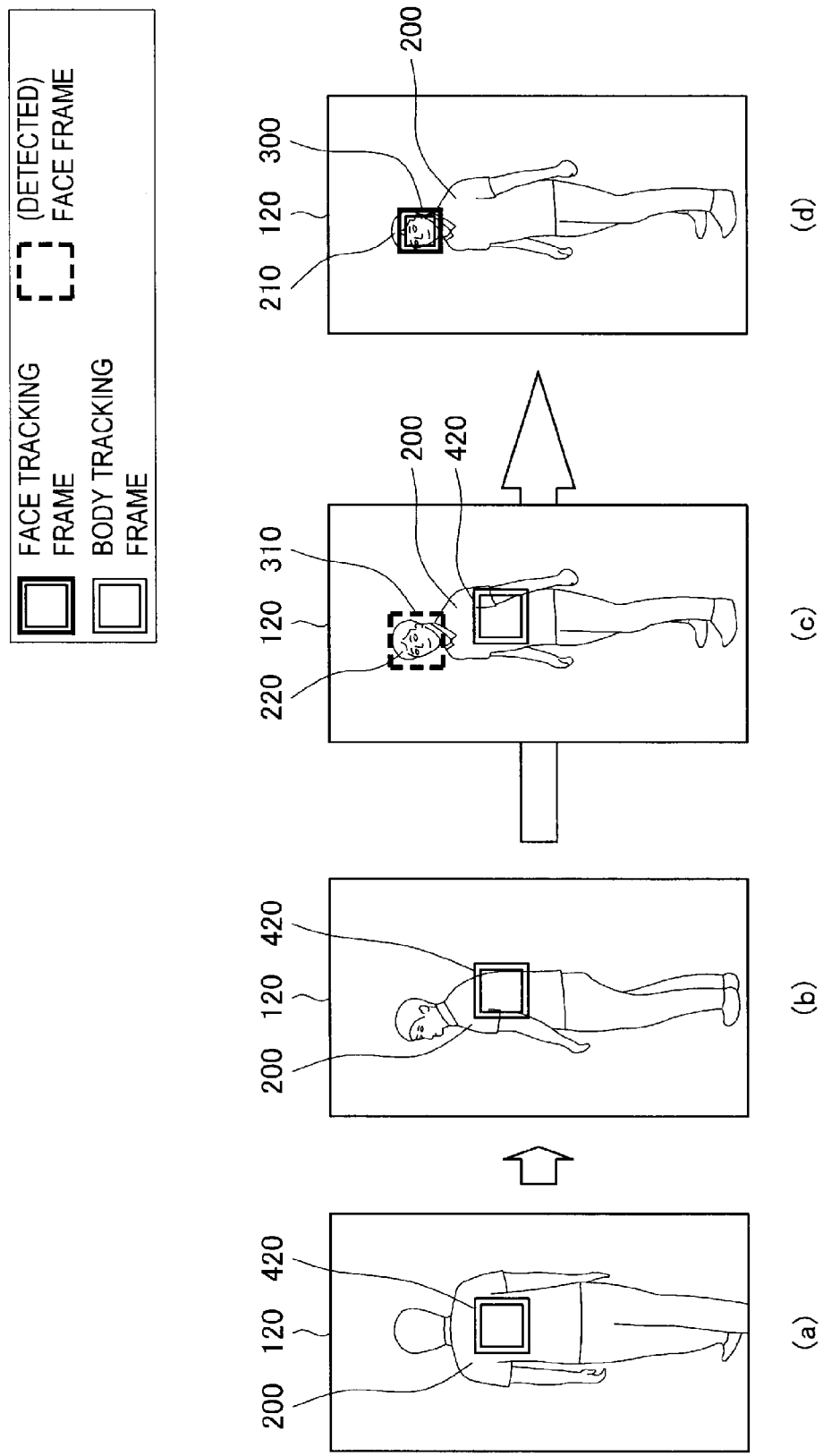
[Fig. 12]

[Fig. 13]
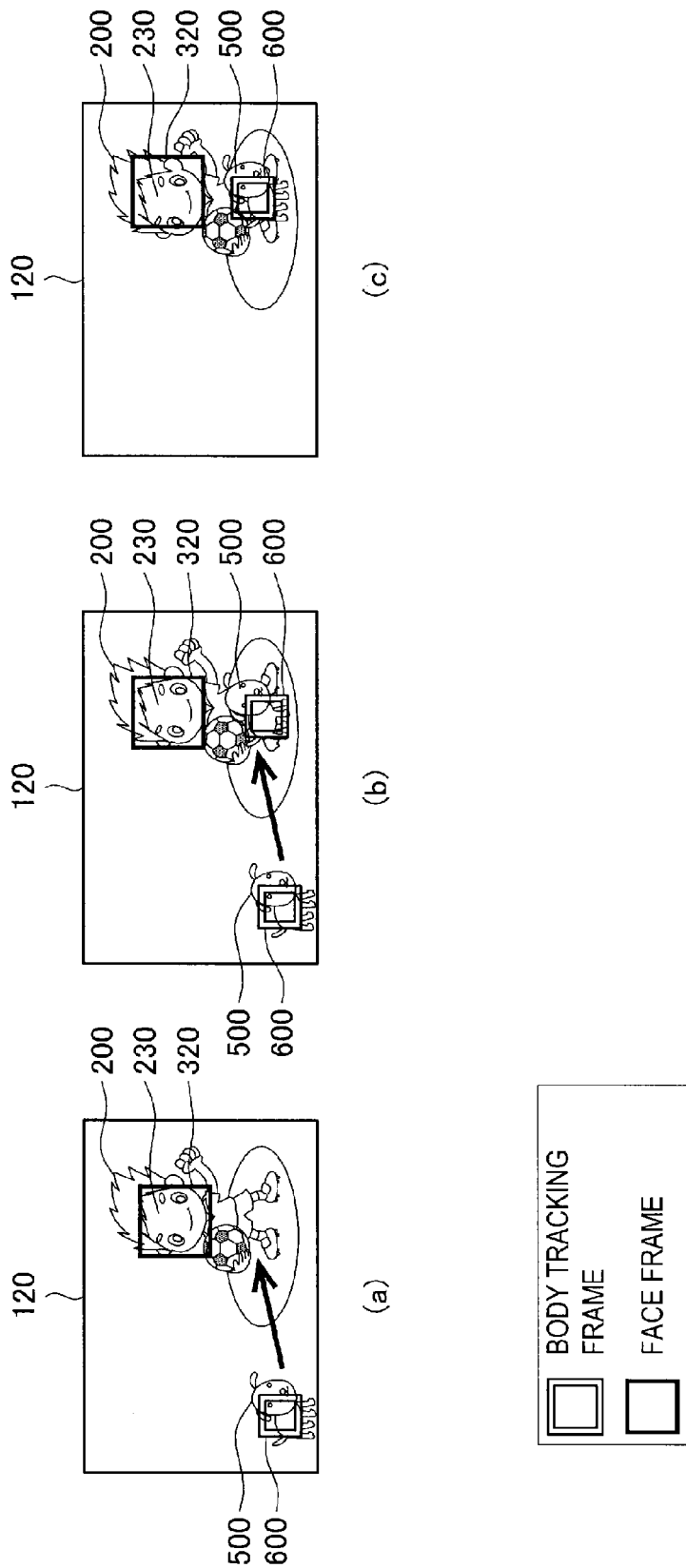

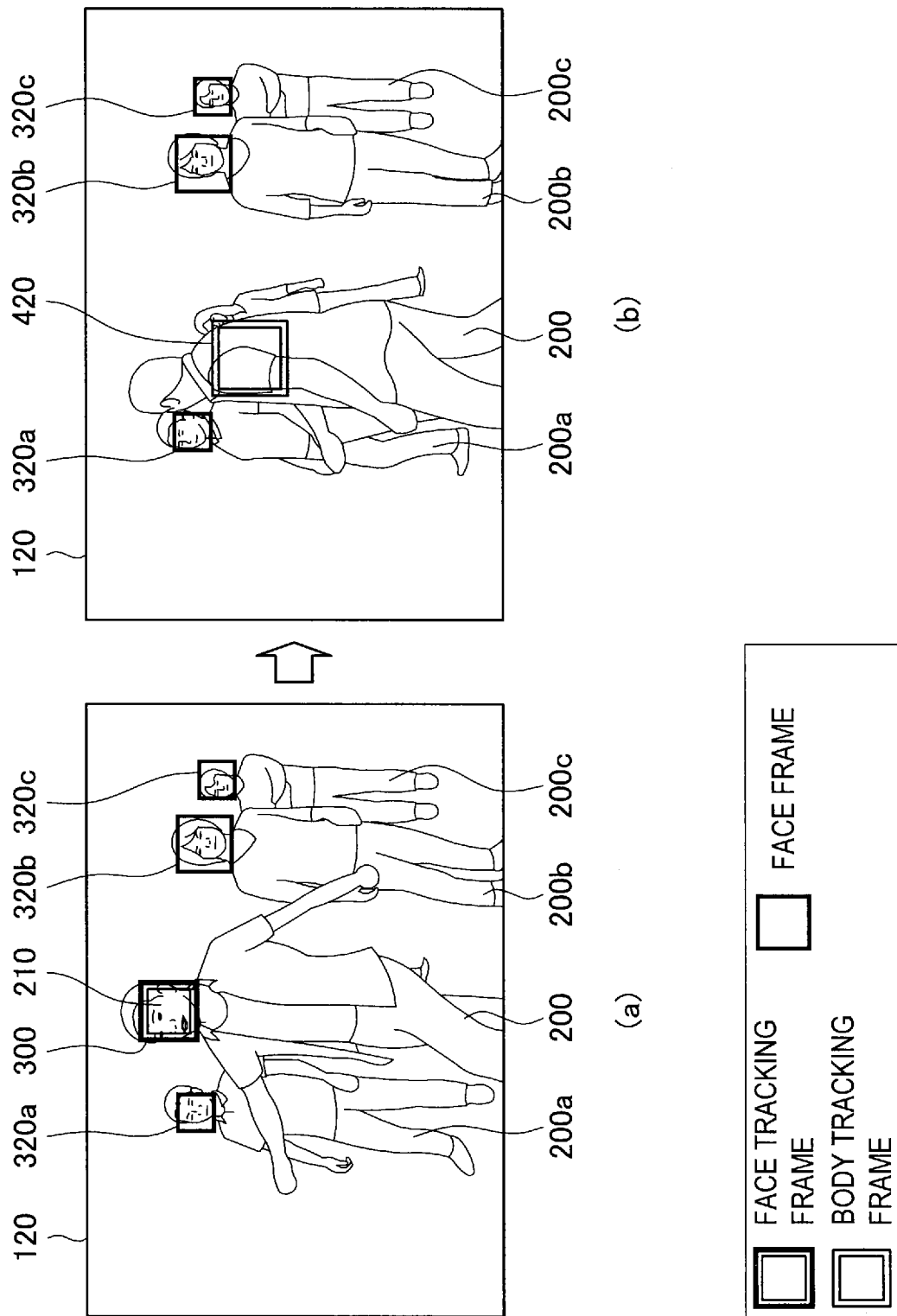
[Fig. 14]

[Fig. 15]
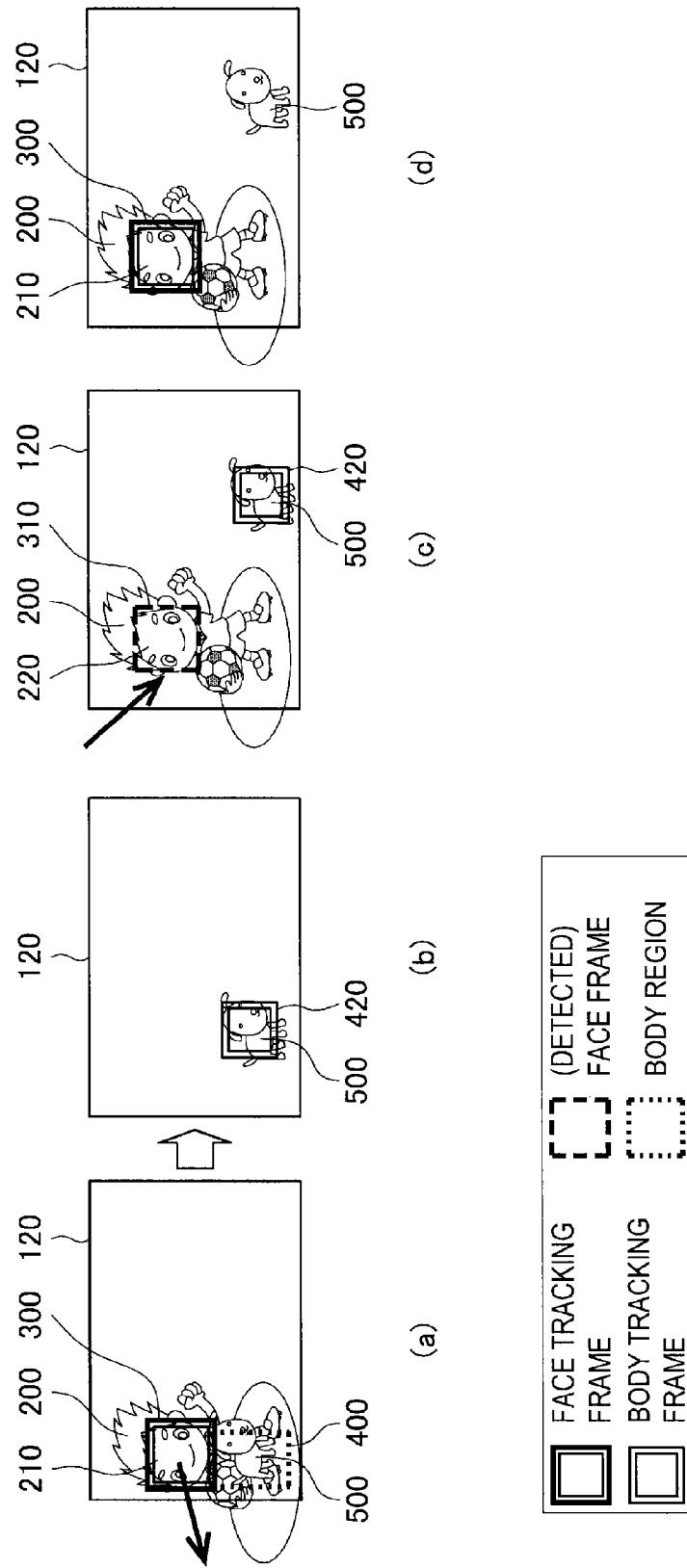

[Fig. 16]
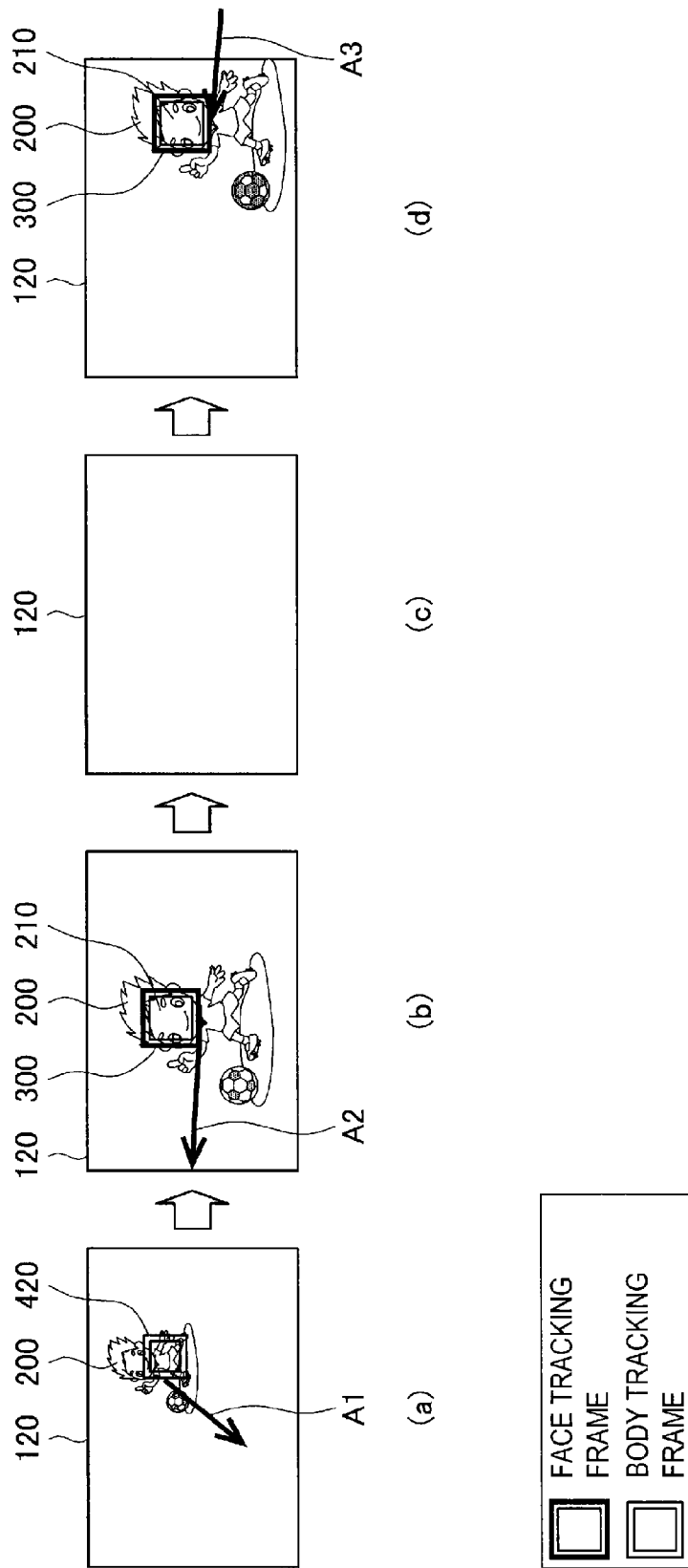

[Fig. 17]
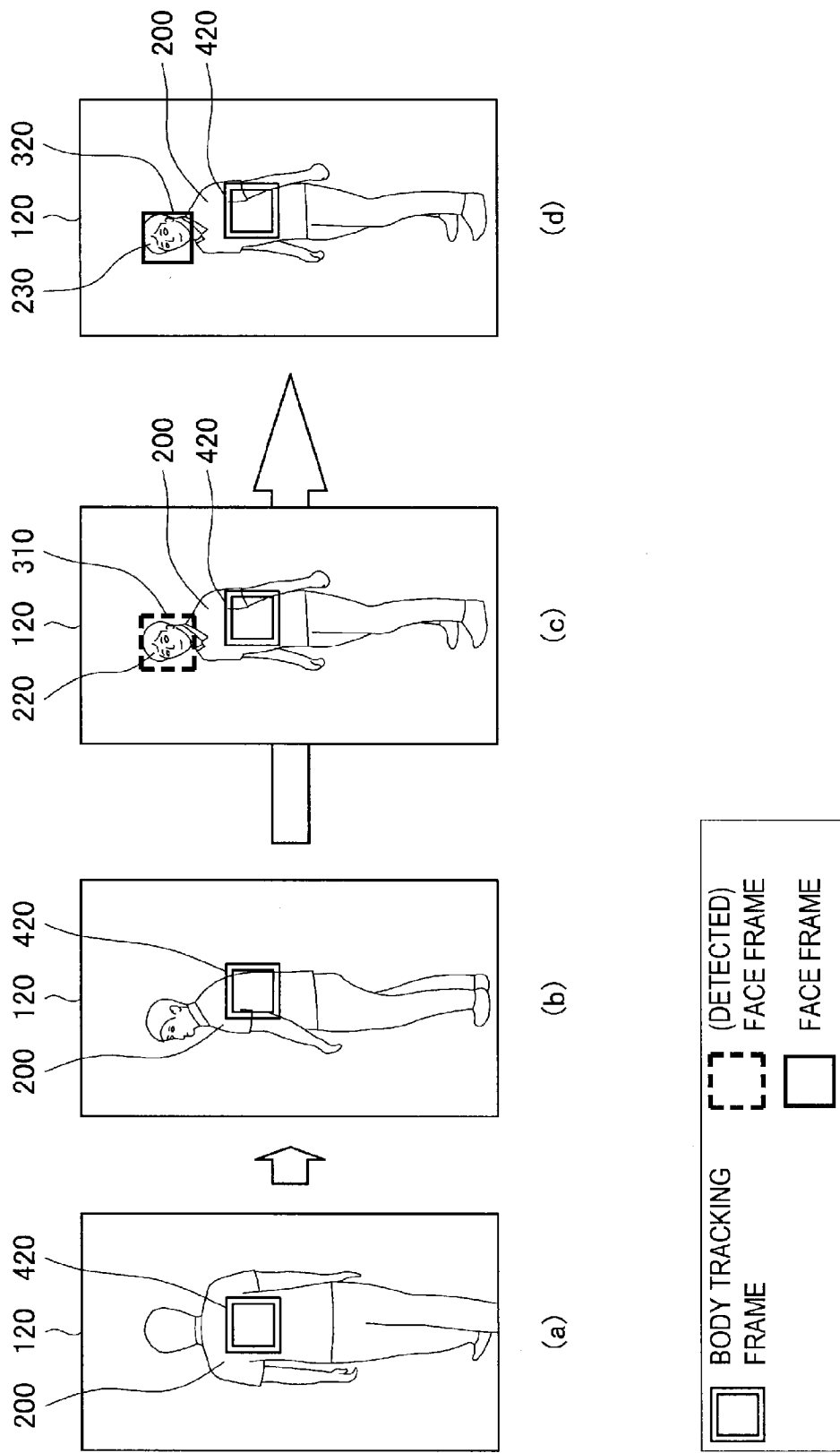

[Fig. 18]
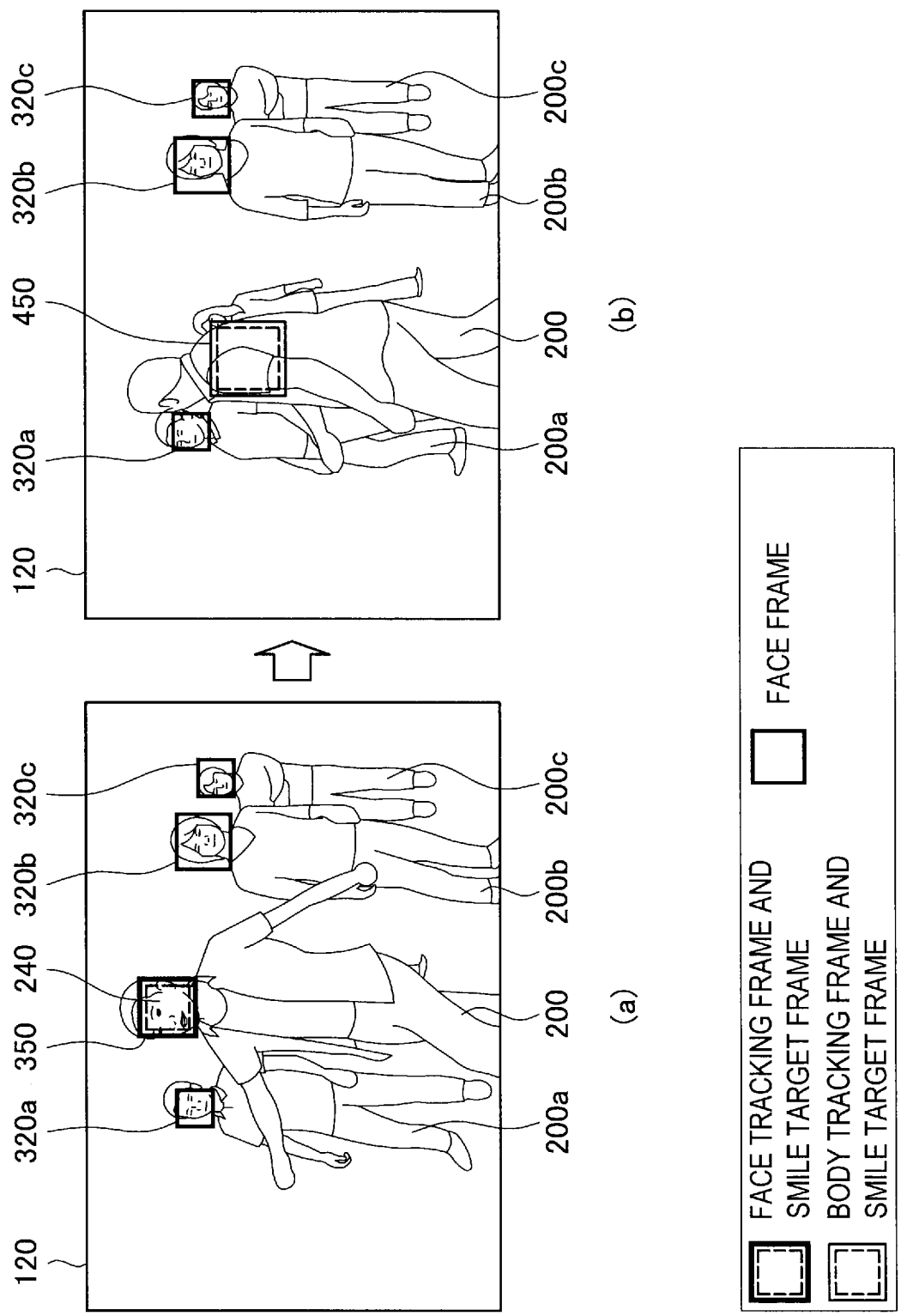

[Fig. 19]
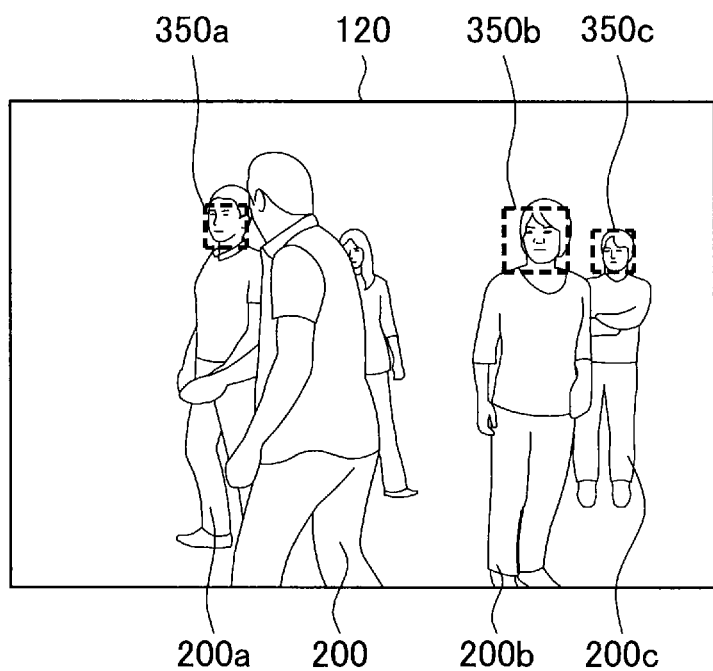

[Fig. 20]
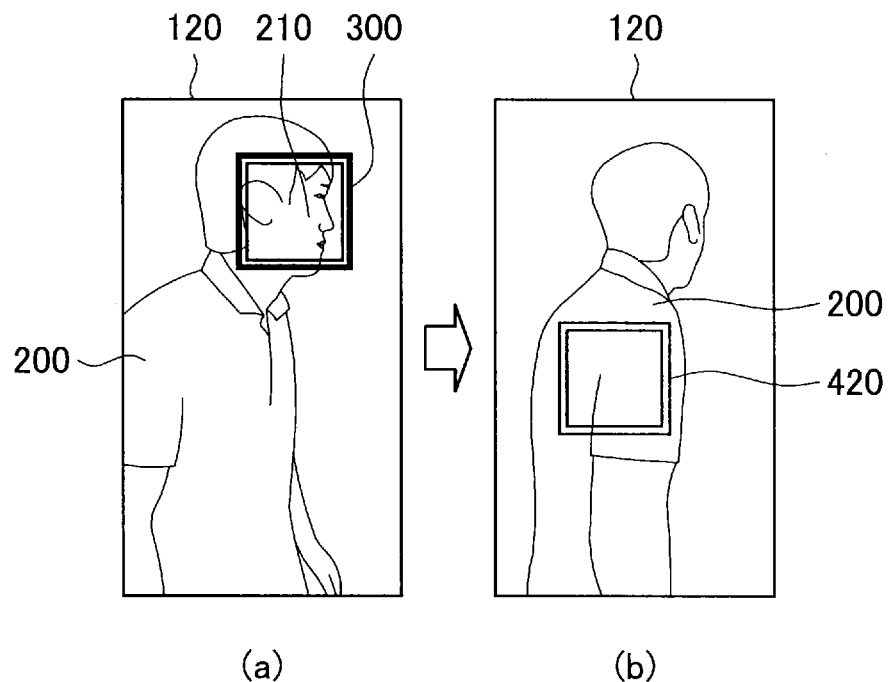
(a)   (b)
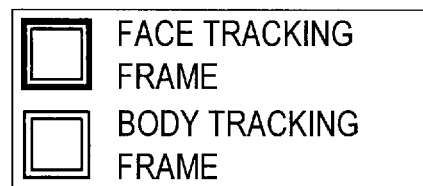

[Fig. 21]
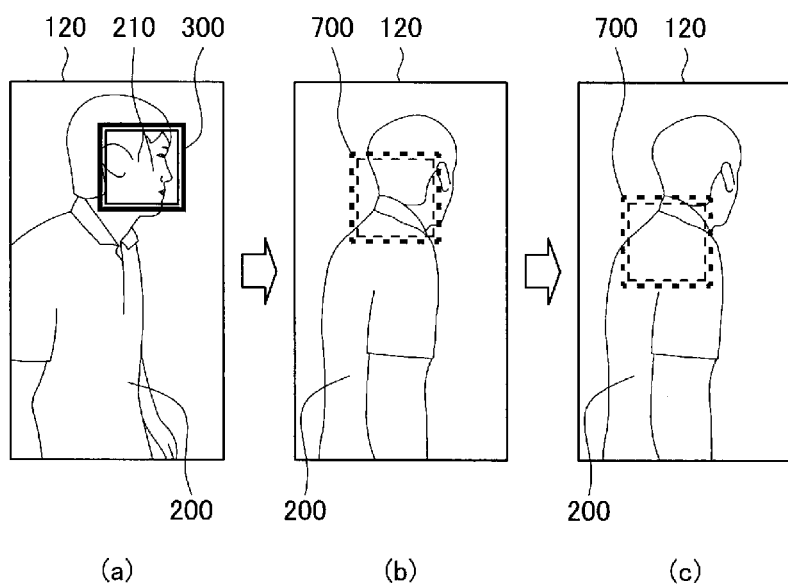

[Fig. 22]
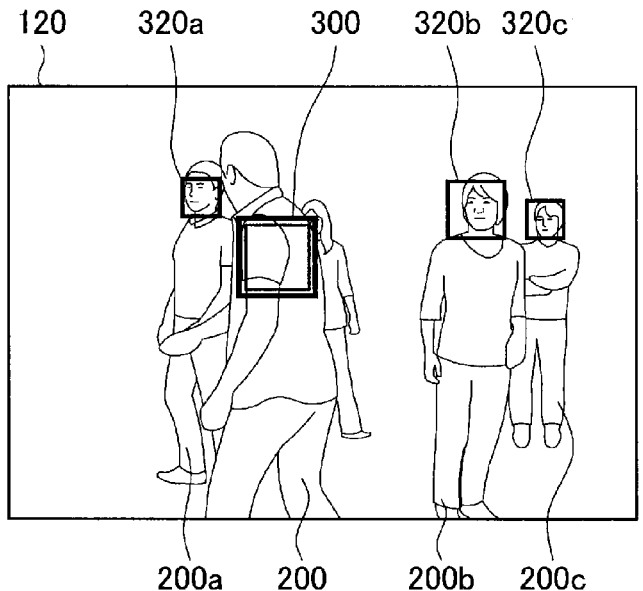
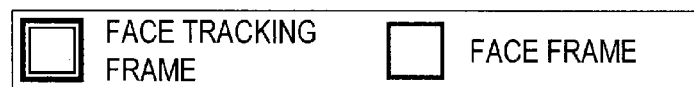
[Fig. 23]
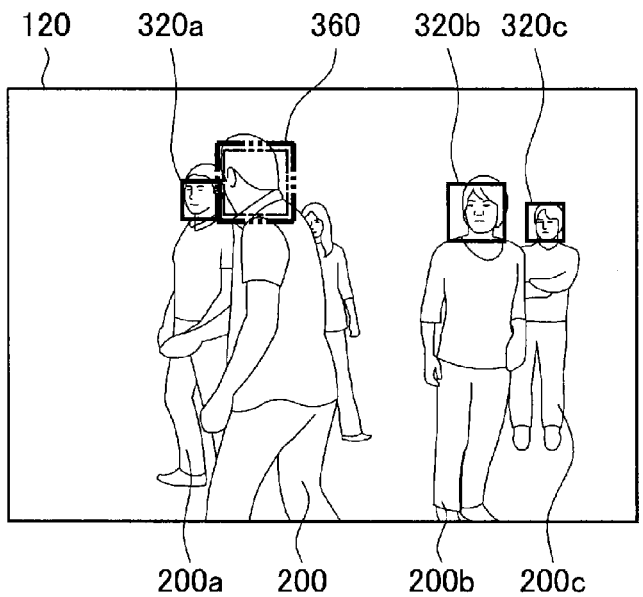

[Fig. 24]
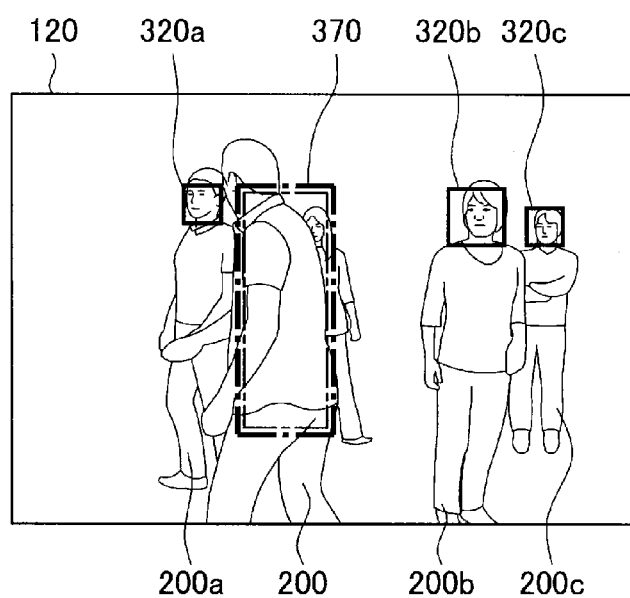
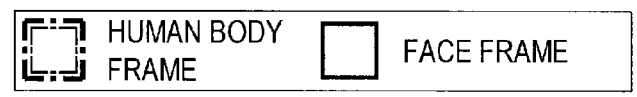

[Fig. 25]
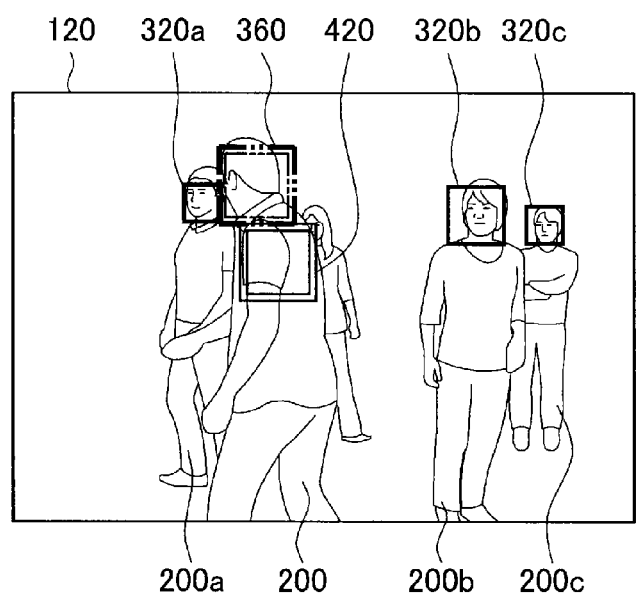
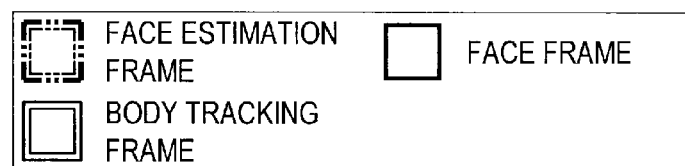

[Fig. 26]
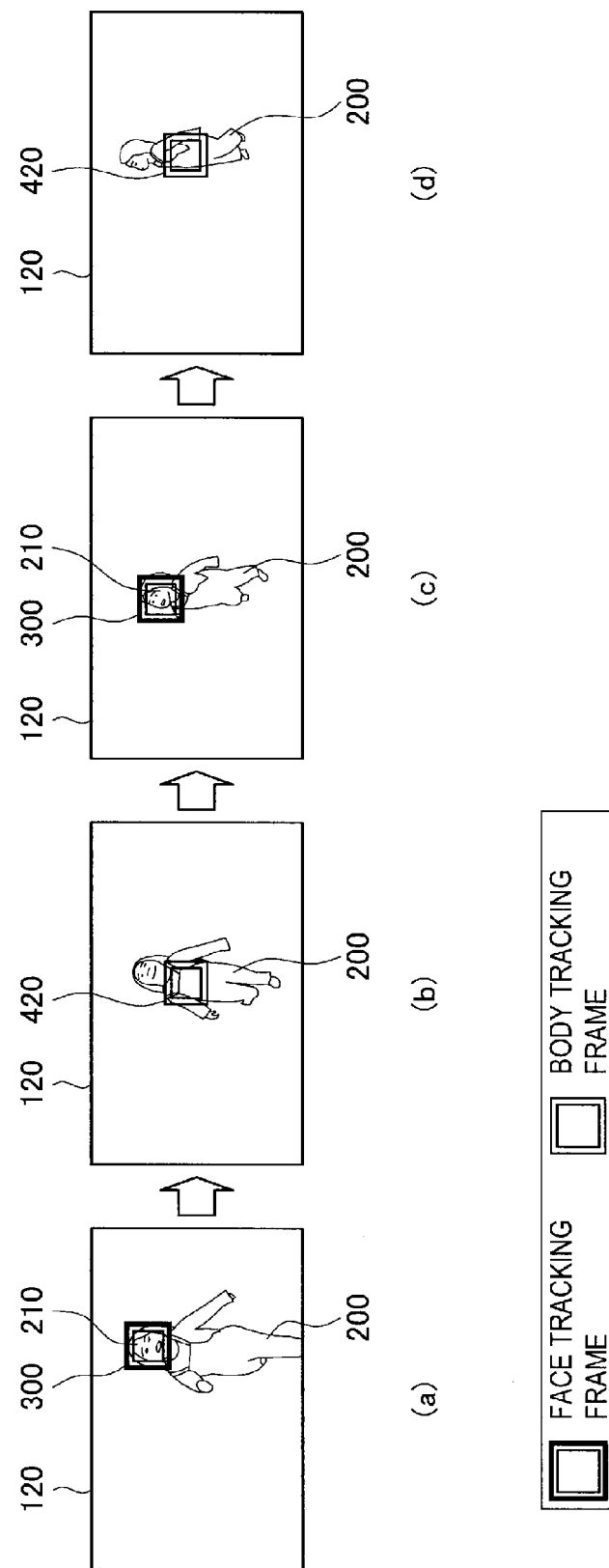

IMAGE PROCESSING TO TRACK FACE REGION OF PERSON

TECHNICAL FIELD

The present disclosure relates to an image processing apparatus, an image processing method, a program, and a recording medium.

BACKGROUND ART

Technology is disclosed in [PTL 1] which detects a face region of a person from a picked-up image, and tracks the face region. The technology disclosed in [PTL 1] can track the person by tracking the face region.

CITATION LIST

Patent Literature

PTL 1: JP 2004-283959A

SUMMARY

Technical Problem

However, in the technology disclosed in [PTL 1], in the case where the face region is not able to be detected, tracking of the person will be interrupted. Accordingly, it is desired to have technology that can perform tracking of a person more reliably.

Solution to Problem

An image processing system includes a face detection unit to detect a face in an image, and a partial region detection unit to detect a partial region of the image based on a position of the face detected in the image.

The image processing system further includes a tracking determination unit to select at least one of the face and the partial region for tracking based on a predetermined condition, and to track the selected at least one of the face and the partial region.

An image processing method includes detecting, in a face detection unit, a face in an image, and detecting, in a partial region detection unit, a partial region of the image based on a position of the face detected in the image.

A non-transitory computer-readable medium encoded with computer-readable instructions thereon, where the computer readable instructions when executed by a computer cause the computer to perform a method that includes detecting a face in an image and detecting a partial region of the image based on a position of the face detected in the image.

Advantageous Effects of Invention

According to the present disclosure described above, tracking of a person can be performed more reliably.

BRIEF DESCRIPTION OF DRAWINGS

FIG. 1 is a block diagram which shows a configuration of an image processing apparatus according to the embodiments of the present disclosure.

FIG. 2 is a flow chart which shows the procedure of processes by the image processing apparatus.

FIG. 3 is a flow chart which shows the procedure of processes by the image processing apparatus.

FIG. 4 is a flow chart which shows the procedure of processes by the image processing apparatus.

FIG. 5 is a flow chart which shows the procedure of processes by the image processing apparatus.

FIG. 6 is a flow chart which shows the procedure of processes by the image processing apparatus.

FIG. 7 is an explanatory diagram which shows an example of a body region set by the image processing apparatus.

FIG. 8 is an explanatory diagram which shows an example of a body region set by the image processing apparatus.

FIG. 9 is an explanatory diagram which shows an example of a body region set by the image processing apparatus.

FIG. 10 is an explanatory diagram which shows a state in which a position relation between a newly detected face region and a body region of a tracking target is judged.

FIG. 11 is an explanatory diagram which shows a state in which a tracking target moves from a face region to a body region.

FIG. 12 is an explanatory diagram which shows a state in which a tracking target moves from a face region to a body region.

FIG. 13 is an explanatory diagram for describing the effect of a tracking process by the image processing apparatus.

FIG. 14 is an explanatory diagram for describing the effect of a tracking process by the image processing apparatus.

FIG. 15 is an explanatory diagram for describing the effect of a tracking process by the image processing apparatus.

FIG. 16 is an explanatory diagram for describing the effect of a tracking process by the image processing apparatus.

FIG. 17 is an explanatory diagram for describing a modified example of the present embodiments.

FIG. 18 is an explanatory diagram for describing a modified example of the present embodiments.

FIG. 19 is an explanatory diagram for describing a process which is performed in the case where tracking of a person is interrupted.

FIG. 20 is an explanatory diagram for describing a modified example of the present embodiments.

FIG. 21 is an explanatory diagram for describing a modified example of the present embodiments.

FIG. 22 is an explanatory diagram for describing a modified example of the present embodiments.

FIG. 23 is an explanatory diagram for describing a modified example of the present embodiments.

FIG. 24 is an explanatory diagram for describing a modified example of the present embodiments.

FIG. 25 is an explanatory diagram for describing a modified example of the present embodiments.

FIG. 26 is an explanatory diagram for describing the effect of the present embodiments.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Examination of the background art
2. Configuration of the image processing apparatus
3. Procedure of processes by the image processing apparatus
4. Effect by the image processing apparatus
5. Various modified examples
6. Conclusion

1. Examination of the Background Art

The present inventors were led to conceiving the image processing apparatus according to the present embodiments by examining background art which tracks a person in a picked-up image. Accordingly, the background art will first be examined.

Technology is disclosed in [PTL 1] which detects a face region of a person from a picked-up image, and tracks the face region. Note that in [PTL 1], an improvement in the accuracy of tracking is achieved by using face detection and skin color region detection simultaneously. On the other hand, technology is also proposed which extracts a partial region (a region in which a part other than the face is depicted, among the respective parts of a person) of a person (photographic subject) from a picked-up image, and tracks a body region. Here, in the present embodiments, the partial region may be every region other than the face of a human body (for example, a region in which the main body is depicted, a region in which the hands are depicted, or the like). In the present embodiments, the partial region is called the body region. In these technologies, a person can be tracked by tracking a face region or a body region. In these technologies, since the condition of a person can be recognized by tracking the person, the setting of various parameters (for example, focus, brightness, or the like, of an image pickup apparatus) according to the condition of the person becomes possible.

However, these technologies are each independent, and there are no known technologies which use both of them simultaneously. Further, in the case where, for example, a person turns their back to an imaging lens, or where the person is a long distance from the imaging lens, the technology which tracks a face region is not able to detect the face region. Then, in the technology which tracks a face region, in the case where the person is not detected, the tracking of the person will be interrupted.

Further, the technology which tracks a body region is weak towards an environmental change, such as a luminance change or a change of posture of a person. That is, the technology which tracks a body region has a low robustness for environmental change. Therefore, in the technology which tracks a body region, there have been cases where the tracking of a body region, that is, the tracking of a person, is interrupted, and the precision of the tracking decreases, according to a change in the environment.

On the other hand, the image processing apparatus according to the present embodiments can use the tracking of a face region and the tracking of a body region simultaneously, and can perform tracking of a person more reliably by appropriately switching between these regions. Hereinafter, the details will be described. Note that an image processing apparatus 1 of the present embodiments can track various types of living bodies including people (such as people, dogs or cats). Needless to say, the image processing apparatus 1 may track only people, or it may track only animals other than people.

2. Configuration of the Image Processing Apparatus

Next, the configuration of the image processing apparatus 1, based on FIG. 1, will be described. The image processing apparatus 1 includes a lens 10, an image pickup section 20, a living body tracking section (tracking section) 30, a display section 40, and an external IF (interface) 50. Note that the image processing apparatus 1 has a hardware configuration, such as a lens, an image pickup element, a CPU, a ROM, a RAM, a flash memory, a display, and a connector. A program for realizing the image pickup section 20, the living body tracking section 30, and the display section 40, in the image processing apparatus 1, is recorded in the ROM. The CPU reads out and executes the program recorded in the ROM. Therefore, the lens 10, the image pickup section 20, the living body tracking section 30, the display section 40, and the external IF (interface) 50 are realized by this hardware configuration.

Since the image processing apparatus 1 includes the lens 10 and the image pickup section 20, it is an image pickup apparatus (a digital still camera, for example). Needless to say, the image processing apparatus 1 may not have the lens 10 and the image pickup section 20. In this case, the image processing apparatus 1 acquires a picked-up image from the outside, and tracks a person based on this picked-up image. Further, while a program necessary for the processes by the image processing apparatus 1 is recorded in the ROM inside the image processing apparatus 1, it may be recorded in an external recording medium. In this case, the image processing apparatus 1, for example, reads out and executes the above program from the external recoding medium. The program may be provided via a network.

The image pickup section 20 has an image pickup element, takes in external light through the lens 10, and generates a picked-up image by irradiating the image pickup element. Note that, as shown in FIG. 7, an x-axis and a y-axis are set to the picked-up image. The axis which extends in the horizontal direction of the picked-up image becomes the x-axis, and the axis which extends in the vertical direction of the picked-up image becomes the y-axis. The image pickup section 20 outputs the picked-up image to the living body tracking section 30. The image pickup section 20 can perform image pickup of still and moving images. In the case where image pickup is performed for a moving image, the image pickup section 20 generates a picked-up image for each prescribed time, which becomes each frame of the moving image, and outputs the picked-up image to the living body tracking section 30. Note that in the following description, the picked-up image is assumed to be the picked-up image of the current frame, unless otherwise noted.

The living body tracking section 30 includes an image memory 31, a face detection section 32, a face collation section 33, a body tracking section 34, a tracking target determination section 35, a body region detection section 36, a feature amount extraction section 37, and a display control section 38. The image memory 31 stores the picked-up image given by the image pickup section 20. Further, the image memory 31 stores a face region list with which a feature amount of the face region and identification information of the face region are correlated. Here, a position of the respective parts of the face region (such as the eyes, nose or mouth), a shape, an outline of the face region or the like, are included as the feature amount of the face region.

The face detection section 32 performs a face detection process which detects the face region of a living body from the picked-up image. The face collation section 33 performs a face collation process which collates the face region of the current frame with a face region in the face region list. In addition, the face collation section 33 performs a face tracking process which tracks the face region of the tracking target, that is, a tracking face region. The body tracking section 34 tracks the body region set by the body region detection section 36. That is, the body tracking section 34 performs a body tracking process. The tracking target determination section 35 determines at least one of the face region and the body region as the tracking target. The body tracking detection section 36 sets a region having a prescribed position relation with the face region as the body region of the tracking target, that is, as a tracking body region. The feature amount extraction section 37 extracts a feature amount from the tracking body region. The display control section 38 displays a picked-up image or the like on the display section 40. The specific processes by this configuration will be described later. The display section 40 displays the picked-up image or the like by the controls of the display control section 38. The external IF 50 is an interface for connecting the image processing apparatus 1 and an external device.

3. Procedure of Processes by the Image Processing Apparatus

Next, the procedure of processes by the image processing apparatus 1 will be described in accordance with the flow charts shown in FIGS. 2-6.

(Overall Process)

First, the overall process will be described in accordance with the flow chart shown in FIG. 2. In step S10, the face detection section 32 performs a face detection process. Specifically, the face detection section 32 acquires a picked-up image from the image memory 31, and detects a face region from the picked-up image. Further, the face detection section 32 superimposes a face frame onto the face region in the picked-up image. The face detection section 32 outputs the picked-up image on which the face frame has been superimposed, that is, a face frame superimposed image, to the face collation section 33.

Note that in the present embodiments, in the case where the face region is upside down or is turned away, it is assumed not to be a target for detection. Note that the face region may be assumed to be a target for detection in the case where it is upside down. Further, in the case where the face region is turned away, such as described above, the position of the face region may be estimated.

Here, there are cases where the face region is upside down, for example, cases where an angle formed by a first reference axis, which is described later, and the y-axis becomes −180 degrees or more and less than −135 degrees, or larger than +135 degree and +180 degrees or less (refer to step S190).

On the other hand, there are cases where the face region is turned away, for example, cases where an angle formed by a second reference axis, which is described later, and an optical axis becomes −180 degrees or more and less than −135 degrees, or larger than +135 degrees and +180 degrees or less (refer to step S240).

In step S20, the face collation section 33 performs a face collation process and a face tracking process. Specifically, the face collation section 33 extracts a feature amount from the face region in a face tracking frame superimposed image, and correlates the face region in the face frame superimposed image with identification information in the face region list, by collating the extracted feature amount with a feature amount in the face region list. Further, in the case where a new face region not registered in the face region list, that is, a face region not detected in the previous frame (one frame previous to the current frame), is present in the face frame superimposed image, the face collation section 33 changes the face frame corresponding to the new face region to a new face frame. Note that the face collation section 33 treats the face region detected in the previous frame as a normal face region.

Next, the face collation section 33 judges whether or not there has been a specifying operation of the face region by a user. In the case where it is judged that there has been a specifying operation on the face region by the user, the face collation section 33 sets the face region, which the user has specified, as the tracking face region, and stores identification information correlated with the tracking face region in the image memory 31. Next, the face collation section 33 superimposes a face tracking frame onto the tracking face region. The face collation section 33 generates first face detection information, indicating that the tracking face region has been detected, and outputs the first face detection information to the tracking target determination section 35. In addition, the face collation section 33 generates a face frame superimposed image on which the face tracking frame has been superimposed, that is, a face tracking frame superimposed image, and outputs the face tracking frame superimposed image to the body region detection section 36 and the display control section 38. Note that face frames other than the face tracking frame may be deleted.

On the other hand, in the case where the tracking face region has already been set, the face collation section 33 acquires identification information correlated with the tracking face region (that is, tracking target identification information) from the image memory 31, and searches for a face region, which has identification information identical to that of the tracking target identification information, from the face frame superimposed image. In the case where a face region, which has identification information identical to that of the tracking target identification information, is detected, the face collation section 33 assumes that this face region is the tracking face region, and superimposes the face tracking frame onto the tracking face region. The face collation section 33 generates first face detection information, indicating that the tracking face region has been detected, and outputs the first face detection information to the tracking target determination section 35. In addition, the face collation section 33 generates a face frame superimposed image on which the face tracking frame has been superimposed, that is, a face tracking frame superimposed image, and outputs the face tracking frame superimposed image to the body region detection section 36 and the display control section 38.

On the other hand, in the case where a face region, which has identification information identical to that of the tracking target identification information, is not able to be detected from the face frame superimposed image, the face collation section 33 generates second face detection information, indicating that the tracking face region is not able to be detected, and outputs the second face detection information to the tracking target determination section 35. In addition, the face collation section 33 outputs the face frame superimposed image to the tracking target determination section 35 and the display control section 38.

Next, the face collation section 33 judges whether or not face region tracking continuation information has been given by the tracking target determination section 35 in the previous frame (that is, whether or not the tracking target is the face region). In the case where it is judged that face region tracking continuation information has been given by the tracking target determination section 35 in the previous frame, the face collation section 33 proceeds to step S30, after performing the following face tracking process. On the other hand, in the case where it is judged that face region tracking continuation information has not been given by the tracking target determination section 35 in the previous frame, the face collation section 33 proceeds to step S30. The above are the contents of the face collation process.

That is, the face collation section 33 searches for the face region of the current frame from the vicinity of the tracking face region of the previous frame. In the case where the face region of the current frame is detected from the vicinity of the tracking face region of the previous frame, the face collation section 33 judges that the detected face region is the tracking face region, and superimposes the face tracking frame onto the tracking face region. Then, the face collation section 33 outputs the first face tracking result information, which shows that the face region of the current frame is detected from the vicinity of the tracking face region of the previous frame, to the tracking target determination section 35. In addition, the face collation section 33 outputs the face tracking frame superimposed image to the body region detection section 36 and the display control section 38.

On the other hand, in the case where the face region of the current frame is not able to be detected from the vicinity of the tracking face region of the previous frame, the face collation section 33 outputs the second face tracking result information, which shows that face tracking is not able to be performed, to the tracking target determination section 35.

Note that the face detection section 32 and the face collation section 33 perform the above described processes of steps S10 and S20, regardless of whether or not the tracking target is the face region.

In step S30, the body tracking section 34 judges whether or not start indication information has been given by the tracking target determination section 35. In the case where start indication information has been given by the tracking target determination section 35, the body tracking section 34 proceeds to step S40, and in the case where it has not been given, the body tracking section 34 proceeds to step S50.

In step S40, the body tracking section 34 acquires a picked-up image from the image memory 31. Next, the body tracking section 34 performs a body tracking process, based on feature amount information given by the feature amount extraction section 37.

Specifically, the body tracking section 34 searches for the tracking body region from the picked-up image. In the case where the tracking body region could be detected from the picked-up image, the body tracking section 34 superimposes the body tracking frame onto part of the tracking body region. Next, the body tracking section 34 outputs the first body tracking result information, indicating that the tracking body region can be detected, and the picked-up image on which the body tracking frame has been superimposed, that is, a body tracking frame superimposed image, to the tracking target determination section 35. In addition, the body tracking section 34 outputs the body tracking frame superimposed image to the display control section 38. The body tracking frame is depicted in a mode (for example, color, size or shape) different from that of the face tracking frame.

On the other hand, in the case where the tracking body region was not able to be detected from the picked-up image, the body tracking section 34 outputs the second body tracking result information, indicating that the tracking body region was not able to be detected, to the tracking target determination section 35.

In step S50, the tracking target determination section 35 performs a tracking target determination process, which is shown in FIG. 3. The tracking target determination process, in summary, is a process which determines at least one of the face region and the body region as the tracking target. In the case where the face region is determined as the tracking target, the tracking target determination section 35 outputs face region tracking continuation information, indicating this, to the face collation section 33. In the case where the face region tracking continuation information has been given, the face collation section 33 continuously performs the above described face tracking process in the next frame. On the other hand, in the case where the body region is determined as the tracking target, the tracking target determination section 35 outputs the start indication information to the body tracking section 34, in step S100 described later. Note that in the case where the face region is determined as the tracking target, and where the reliability of the face region becomes equal to or below a prescribed value, the tracking target determination section 35 outputs the start indication information to the body tracking section 34. That is, in the present embodiments, there are cases where the face region and the body region are tracked in parallel.

In step S60, the tracking target determination section 35 judges whether or not the tracking target is the face region. In the case where it is judged that the tracking target is the face region, the tracking target determination section 35 proceeds to step S70, and in the case where it is judged that the tracking target is the body region, the tracking target determination section 35 proceeds to step S100.

In step S70, the tracking target determination section 35 outputs body region detection indication information, indicating the detection of the body region, to the body region detection section 36. In the case where the body region detection indication information has been given, the body region detection section 36 performs a body region detection process, which is shown in FIG. 4. The body region detection process, in summary, is a process which detects a region having a prescribed position relation with the face region as a search body region. Here, the prescribed position relation, in summary, means a position relation in which the face region and the body region are connected by a neck part of the face region. This face region and body region are presumed to constitute the same photographic subject (living body). Further, the body region indicates an arbitrary part other than the face, among the respective parts of the living body. The body region detection section 36 outputs body region information, which is related to the body region, to the feature amount extraction section 37.

In step S80, the feature amount extraction section 37 extracts a feature amount of the body region from the body region, based on the body region information. Here, body color (skin color) or the like is included as the feature amount of the body region. The feature amount extraction section 37 generates feature amount information, which is related to the feature amount of the body region, and outputs the feature amount information to the body tracking section

34. The body tracking section 34 performs a body tracking process in the next frame, based on the feature amount information.

In step S90, the face collation section 33 performs a face registration process. Specifically, the face collation section 33 registers the feature amount of a new face region, and identification information corresponding to the new face region, in the face region list.

In step S100, the tracking target determination section 35 performs a next-occasion tracking target judgment process. The next-occasion tracking target judgment process, in summary, is a process which determines whether or not to perform a body tracking process in the next frame. Thereafter, the image processing apparatus 1 ends the process.

(Tracking Target Determination Process)

Next, the procedure of the tracking target determination process, based on FIG. 3, will be described. In step S110, the tracking target determination section 35 judges whether or not the tracking face region has been detected by the collation process. Specifically, the tracking target determination section 35 judges whether or not first face detection information has been given by the face collation section 33. In the case where it is judged that first face detection information has been given, the tracking target determination section 35 proceeds to step S120, and in the case where it is judged that not first face detection information but second face detection information has been given, the tracking target determination section 35 proceeds to step S130.

In step S120, the tracking target determination section 35 determines that the tracking target is the face region. That is, in the case where a face region identical to the tracking face region has been detected by the collation process, the tracking target determination section 35 determines that the tracking target is the face region. Thereafter, the tracking target determination section 35 ends the tracking target determination process.

In step S130, the tracking target determination section 35 judges whether or not the face collation section 33 is performing face tracking, and whether or not the tracking face region was able to be detected. Specifically, the tracking target determination section 35 judges whether or not first face tracking result information has been given by the face collation section 33. In the case where it is judged that first face tracking result information has been given by the face collation section 33, the tracking target determination section 35 proceeds to step S120, and in the case where it is judged that not first face tracking result information but second face tracking result information has been given by the face collation section 33, the tracking target determination section 35 proceeds to step S140. Therefore, in the case where a face region identical to the tracking face region has been detected by the face tracking process, the tracking target determination section 35 determines that the tracking target is the face region.

In step S140, the tracking target determination section 35 judges whether or not the body tracking process has succeeded. Specifically, the tracking target determination section 35 judges whether or not first body tracking result information has been given by the body tracking section 34. In the case where it is judged that first body tracking result information has been given by the body tracking section 34, the tracking target determination section 35 proceeds to step S150, and in the case where it is judged that not first body tracking result information but second body tracking result information has been given by the body tracking section 34, the tracking target determination section 35 proceeds to step S180.

In step S150, the tracking target determination section 35 performs a connection judgment process. The connection judgment process, in summary, is a process which connects the new face region with the tracking body region. In the case where the new face region and the tracking body region have the above described prescribed position relation, that is, where it is presumed that the new face region and the tracking body region constitute the same photographic subject, the tracking target determination section 35 connects them.

In step S160, the tracking target determination section 35 judges whether or not the new face region and the tracking body region have been connected, and in the case where it is judged that they are connected, the tracking target determination section 35 proceeds to step S120, and in the case where it is judged that that they are not connected, the tracking target determination section 35 proceeds to step S170. Therefore, even if there are cases where the new face region is not detected by the collation process and the face tracking process of the current frame, in the case where the new face region is connected with the tracking body region, the tracking target determination section 35 sets the tracking target to the face region.

In step S170, the tracking target determination section 35 sets the tracking target to the body region. Therefore, in the case where the new face region is not detected by the collation process and the face tracking process of the current frame, and where the new face region is not connected with the tracking body region, the tracking target determination section 35 sets the tracking target to the body region. Thereafter, the tracking target determination section 35 ends the tracking target determination process.

In step S180, the tracking target determination section 35 performs a determination, indicating that tracking has ended. This is because neither of the tracking face region and the tracking body region has been detected. Thereafter, the tracking target determination section 35 ends the tracking target determination process.

(Body Region Detection Process)

Next, the procedure of the body region detection process, based on FIG. 4, will be described. In step S190, the body region detection section 36 judges whether or not a roll direction of the tracking face region faces the front. Here, the roll direction is a rotation direction on the picked-up image. Specifically, the body region detection section 36 first sets the first reference axis parallel to the direction in which the neck part of the face region extends. Then, the body region detection section 36 adjusts the first reference axis, based on the position of the respective parts (such as the eyes, nose or mouth) within the tracking face region. For example, in the case where the first reference axis is not perpendicular to a straight line connecting both of the eyes, the body region detection section 36 rotates the first reference axis so that they are perpendicular. The first reference axis has a direction in which the direction facing the neck from the eyes is positive.

Next, the body region detection section 36 detects an angle formed by the first reference axis and the y-axis. In the case where the angle formed by these axes is larger than −45 degrees and smaller than +45 degrees, the body region detection section 36 judges that the roll direction of the tracking face region faces the front. Note that the angle, which becomes the reference for judging by the body region detection section 36, is not limited to the values indicated here. It is the same hereinafter. The angle formed by the first reference axis and the y-axis becomes 0 degrees when the photographic subject stands straight, and a counterclockwise direction is assumed to be the positive direction. An example is shown in FIG. 7(a) in which the roll direction of the tracking face region faces the front. In this example, a tracking face region 210 and a face tracking frame 300 are depicted in a face tracking frame superimposed image 100, and the angle formed by the first reference axis and the y-axis is almost 0 degrees.

In the case where it is judged that the roll direction of the tracking face region faces the front, the body region detection section 36 proceeds to step S200, and in the case where it is judged that the roll direction of the tracking face region is a direction other than that which faces the front, the body region detection section 36 proceeds to step S210.

In step S200, the body region detection section 36 detects (sets) a region, adjacent to the neck part of the tracking face region and extending in a positive axial direction of the first reference axis (the positive axial direction of the first reference axis is longer than an axial direction perpendicular to this axis), as the tracking body region. For example, the body region detection section 36, in the example shown in FIG. 7(a), sets a vertically long region 400 to a direction downward of the tracking face region 210, and this is assumed to be the tracking body region.

Next, the body region detection section 36 adjusts the shape of the tracking body region, based on the size of the tracking face region, generation information, and gender information. Here, generation information is a classification, for example, of an infant, a child, and an adult. For example, the body region detection section 36 sets the tracking body region larger as the tracking face region gets larger. This is because of the presumption that the age of the photographic subject increases and the tracking body region gets larger as the tracking face region gets larger. Further, the body region detection section 36 sets smaller the ratio of the size of the tracking body region to the tracking face region as the generation, which the tracking face region indicates, gets younger. This is because an infant or child has a body which is small with respect to the size of their head. Further, the body region detection section 36 adjusts the body region so that the body region of a female is smaller than the body region of a male. Thereafter, the body region detection section 36 proceeds to step S240.

In step S210, the body region detection section 36 judges whether or not the roll direction of the tracking face region inclines to the left. In the case where it is judged that the roll direction of the tracking face region inclines to the left, the body region detection section 36 proceeds to step S220, and in the case where it is judged that the roll direction of the tracking face region inclines to the right, the body region detection section 36 proceeds to step S230.

In the case where the angle formed by the first reference axis and the y-axis is +45 degrees or more and +135 degrees or less, the body region detection section 36 judges that the roll direction of the tracking face region inclines to the left. An example is shown in FIG. 7(b) in which the roll direction of the tracking face region inclines to the left. In this example, the tracking face region 210 and the face tracking frame 300 are depicted in the face tracking frame superimposed image 100, and the angle formed by the first reference axis and the y-axis is almost 90 degrees.

On the other hand, in the case where the angle formed by the first reference axis and the y-axis is −135 degrees or more and −45 degrees or less, the body region detection section 36 judges that the roll direction of the tracking face region inclines to the right. An example is shown in FIG. 7(c) in which the roll direction of the tracking face region inclines to the right. In this example, the tracking face region 210 and the face tracking frame 300 are depicted in the face tracking frame superimposed image 100, and the angle formed by the first reference axis and the y-axis is almost −90 degrees.

In step S220, the body region detection section 36 detects (sets) a region, adjacent to the neck part of the tracking face region and extending in a positive axial direction of the first reference axis, as the tracking body region. For example, the body region detection section 36, in the example shown in FIG. 7(b), sets a horizontally long region 400 to a direction to the right of the tracking face region 210, and this is assumed to be the tracking body region. Next, the body region detection section 36 adjusts the shape of the tracking face region, based on the size of the tracking face region, generation information, and gender information. Thereafter, the body region detection section 36 proceeds to step S240.

In step S230, the body region detection section 36 detects (sets) a region, adjacent to the neck part of the tracking face region and extending in a positive axial direction of the first reference axis, as the tracking body region. In the example shown in FIG. 7(c), the body region detection section 36 sets a horizontally long region 400 to a direction to the left of the tracking face region 210, and this is assumed to be the tracking body region. Next, the body region detection section 36 adjusts the shape of the tracking face region, based on the size of the tracking face region, generation information, and gender information. Thereafter, the body region detection section 36 proceeds to step S240.

In step S240, the body region detection section 36 judges whether or not a yaw direction of the tracking face region faces the front. Here, the yaw direction is a rotation direction on a plane (that is, a yaw direction reference surface) which is perpendicular to the first reference axis. Specifically, the body region detection section 36 first sets an axis, which projects the line-of-sight of the photographic subject to the yaw direction reference surface, as a second reference axis. The second reference axis has a direction in which the direction facing the lens 10 from the photographic subject is positive. Then, the body region detection section 36 adjusts the second reference axis, based on the position of the respective parts (such as the eyes, nose or mouth) within the tracking face region. For example, in the case where the second reference axis does not pass through a projection point, which projects the central point of the mouth to the yaw direction reference surface, the body region detection section 36 adjusts the position of the second reference axis so that the second reference axis passes through the projection point.

Next, the body region detection section 36 detects an angle formed by the second reference axis and the optical axis. In the case where the angle formed by these axes is larger than −10 degrees and smaller than +10 degrees, the body region detection section 36 judges that the yaw direction of the tracking face region faces the front. Here, the optical axis is assumed to have a direction in which the direction facing the lens 10 from the photographic subject is positive. The angle formed by the second reference axis and the optical axis becomes 0 degrees in the case where the photographic subject is directed towards the lens 10 side, and where the second reference axis becomes parallel to the optical axis, and assumes that a counterclockwise direction on the yaw direction reference surface is the positive direction. An example is shown in FIG. 8(a) in which the yaw direction of the tracking face region faces the front. In this example, the tracking face region 210 and the face tracking frame 300 are depicted in the face tracking frame superimposed image 100, and the angle formed by the second reference axis and the optical axis is almost 0 degrees.

In the case where it is judge that the yaw direction of the tracking face region faces the front, the body region detection section 36 proceeds to step S310, and in the case where it is judged that the yaw direction of the tracking face region is a direction other than that which faces the front, the body region detection section 36 proceeds to step S250.

In step S250, the body region detection section 36 judges whether or not the yaw direction of the tracking face region faces to the left. In the case where the angle formed by the second reference axis and the optical axis is −135 degrees or more and −10 degrees or less, the body region detection section 36 judges that the yaw direction of the tracking face region faces to the left. Examples are shown in FIGS. 8(b) and 8(c) in which the yaw direction of the tracking face region faces to the left. In the example shown in FIG. 8(b), the tracking face region 210 and the face tracking frame 300 are depicted in the face tracking frame superimposed image 100, and the angle formed by the second reference axis and the optical axis is approximately −30 degrees. In the example shown in FIG. 8(c), the tracking face region 210 and the face tracking frame 300 are depicted in the face tracking frame superimposed image 100, and the angle formed by the second reference axis and the optical axis is approximately −90 degrees.

On the other hand, in the case where the angle formed by the second reference axis and the optical axis is +10 degrees or more and +135 degrees or less, the body region detection section 36 judges that the yaw direction of the tracking face region faces to the right. Examples are shown in FIGS. 8(d) and 8(e) in which the yaw direction of the tracking face region faces to the right. In the example shown in FIG. 8(d), the tracking face region 210 and the face tracking frame 300 are depicted in the face tracking frame superimposed image 100, and the angle formed by the second reference axis and the optical axis is approximately +30 degrees. In the example shown in FIG. 8(e), the tracking face region 210 and the face tracking frame 300 are depicted in the face tracking frame superimposed image 100, and the angle formed by the second reference axis and the optical axis is approximately +90 degrees.

In the case where it is judged that the yaw direction of the tracking face region faces to the left, the body region detection section 36 proceeds to step S260, and in the case where it is judged that the yaw direction of the tracking face region faces to the right, the body region detection section 36 proceeds to step S290.

In step S260, the body region detection section 36 judges whether or not the angle formed by the second reference axis and the optical axis is −45 degrees or more and −10 degrees or less. That is, the body region detection section 36 judges whether or not the rotation in the yaw direction of the tracking face region is small. In the case where it is judged that the angle formed by the second reference axis and the optical axis is −45 degrees or more and −10 degrees or less (that is, the rotation in the yaw direction of the tracking face region is small), the body region detection section 36 proceeds to step S270. On the other hand, in the case where it is judged that the angle formed by the second reference axis and the optical axis is smaller than −45 degrees (that is, the rotation in the yaw direction is large), the body region detection section 36 proceeds to step S280.

In step S270, the body region detection section 36 moves the tracking body region slightly in the direction opposite to the rotation direction of the second reference axis. For example, the body region detection section 36 moves the tracking body region only about ¼ of the width of the face tracking frame 300 (the length of the x-axis direction) in the direction opposite to the rotation direction of the second reference axis. In the example shown in FIG. 8(b), for example, since the tracking face region 210 rotates to the left in the picked-up image, the body region detection section 36 moves the tracking body region 400 only about ¼ of the width of the face tracking frame to the right. Thereafter, the body region detection section 36 proceeds to step S320.

In step S280, the body region detection section 36 moves the tracking body region considerably in the direction opposite to the rotation direction of the second reference axis. For example, the body region detection section 36 moves the tracking body region only about ½ of the width of the face tracking frame 300 in the direction opposite to the rotation direction of the second reference axis. In the example shown in FIG. 8(c), for example, since the tracking face region 210 rotates to the left in the picked-up image, the body region detection section 36 moves the tracking body region 400 only about ½ of the width of the face tracking frame to the right. Thereafter, the body region detection section 36 proceeds to step S320.

In step S290, the body region detection section 36 judges whether or not the angle formed by the second reference axis and the optical axis is +10 degrees or more and +45 degrees or less. That is, the body region detection section 36 judges whether or not the rotation in the yaw direction of the tracking face region is small. In the case where it is judged that the angle formed by the second reference axis and the optical axis is +10 degrees or more and +45 degrees or less, the body region detection section 36 proceeds to step S300. On the other hand, in the case where it is judged that the angle formed by the second reference axis and the optical axis is larger than +45 degrees (that is, the rotation in the yaw direction is large), the body region detection section 36 proceeds to step S310.

In step S300, the body region detection section 36 moves the tracking body region slightly in the direction opposite to the rotation direction of the second reference axis. For example, the body region detection section 36 moves the tracking body region only about ¼ of the width of the face tracking frame 300 (the length of the x-axis direction) in the direction opposite to the rotation direction of the second reference axis. In the example shown in FIG. 8(d), for example, since the tracking face region 210 rotates to the right in the picked-up image, the body region detection section 36 moves the tracking body region 400 only about ¼ of the width of the face tracking frame to the left. Thereafter, the body region detection section 36 proceeds to step S320.

In step S310, the body region detection section 36 moves the tracking body region considerably in the direction opposite to the rotation direction of the second reference axis. For example, the body region detection section 36 moves the tracking body region only about ½ of the width of the face tracking frame 300 in the direction opposite to the rotation direction of the second reference axis. In the example shown in FIG. 8(e), for example, since the tracking face region 210 rotates to the right in the picked-up image, the body region detection section 36 moves the tracking body region 400 only about ½ of the width of the face tracking frame to the left. Thereafter, the body region detection section 36 proceeds to step S320.

In step S320, the body region detection section 36 adjusts the tracking body region based on the direction and the rotation angle of a pitch direction (the long direction of the neck) of the tracking face region. Here, the pitch direction is a rotation direction on a plane (that is, a pitch direction reference surface) which includes the first reference axis and the optical axis. Specifically, the body region detection section 36 first sets an axis, which projects the line-of-sight of the photographic subject to the pitch direction reference surface, as a third reference axis. The third reference axis has a direction in which the direction facing the lens 10 from the photographic subject is positive. Then, the body region detection section 36 adjusts the third reference axis, based on the position of the respective parts (such as the eyes, nose or mouth) within the tracking face region. For example, in the case where a projected straight line, which projects a straight line passing through the nose and a central point of the mouth to the pitch direction reference surface, and the third reference axis are not perpendicular, the body region detection section 36 rotates the third reference axis so that they are perpendicular.

Next, the body region detection section 36 detects the angle formed by the third reference axis and the optical axis, that is, the rotation angle in the pitch direction of the tracking face region. Here, the rotation angle in the pitch direction of the tracking face region becomes 0 degrees when the photographic subject is directed towards the lens 10 side, and when the third reference axis becomes parallel to the optical axis, and assumes that a counterclockwise direction on the pitch direction reference surface is the positive direction. The rotation angle in the pitch direction of the tracking face region, in summary, becomes a negative value when the photographic subject brings their face close to their body, and becomes a positive value when the photographic subject keeps their face away from their body. In the case where the rotation angle in the pitch direction of the tracking face region becomes a positive value, the body region detection section 36 sets the tracking body region larger as the absolute value of the rotation angle gets larger, in the positive direction of the first reference axis. On the other hand, in the case where the rotation angle in the pitch direction of the tracking face region becomes a negative value, the body region detection section 36 sets the tracking body region smaller as the absolute value of the rotation angle gets larger, in the positive direction of the first reference axis.

Next, the body region detecting region 36 cuts out a region, which protrudes outside the picked-up image, from within the tracking body region. Here, in the case where the tracking face region is arranged at the edge of the picked-up image, for example, the case where the tracking face region is very large is included as the case where part of the tracking body region protrudes outside the picked-up image. An example is shown in FIG. 9(*a*) in which part of the tracking body region protrudes outside the picked-up image. In the example shown in FIG. 9(*a*), the tracking face region 210 and the face tracking frame 300 are depicted in the face tracking frame superimposed image 100, and part of the tracking body region 400 protrudes below the face tracking frame superimposed image 100.

In step S330, the body region detection section 36 judges whether or not the tracking body region has a certain size or more with respect to the tracking face region. In the case where it is judged that the tracking body region has a certain size or more with respect to the tracking face region, the body region detection section 36 ends the body region detection process, and in the case where the tracking body region has a size less than a certain size with respect to the tracking face region, the body region detection section 36 proceeds to step S335.

In step S335, the body region detection section 36 extends the tracking body region in the direction of the tracking face region. An example is shown in FIG. 9(*b*) in which the tracking body region is extended in the direction of the tracking face region. In the case where the process of step S335 is performed, as shown in FIG. 9(*b*), part of the tracking body region is superimposed onto the tracking face region. Note that the size of the extended region may be substantially the same as the region cut out by step S320. Thereafter, the body region detection section 36 ends the body region detection process.

Note that the body region detection section 36 may detect the tracking body region by using movement information (movement vectors) of the region surrounding the tracking face region, and information other than the picked-up image (for example, infrared information, distance information, thermograph information, or the like), simultaneously. For example, the body region detection section 36 may detect a region, which has a movement similar to that of the tracking face region, as the tracking body region. In addition, the body region detection section 36 may detect a region, which has a temperature similar to that of the tracking face region, as the tracking body region. In addition, the body region detection section 36 may detect a region, in which the distance from the lens 10 is similar to that of the tracking face region, as the tracking body region.

(Connection Judgment Process)

Next, the connection judgment process shown in step S150, based on FIG. 5, will be described. In step S340, the tracking target determination section 35 generates an image for connection judgment, by combining the face frame superimposed image given by the face collation section 33 and the body tracking frame superimposed image given by the body tracking section 34. In the case where the face collation section 33 detects a new face region, the new face region and a new face frame are included in this image for connection judgment. Further, the body tracking frame is included in the image for connection judgment. Next, the tracking target determination section 35 calculates the center of gravity of the body tracking frame. The center of gravity of the body tracking frame becomes a central point of the body tracking frame, for example.

In step S350, the tracking target determination section 35 judges whether or not the roll direction of the new face region faces the front. The specific process contents are similar to those of step S190. In the case where it is judged that the roll direction of the new face region faces the front, the tracking target determination section 35 proceeds to step S360, and if it is judged that the roll direction of the new face region is a direction other than that which faces the front, the tracking target determination section 35 proceeds to step S370.

In step S360, the body region detection section 36 sets a region, adjacent to the neck part of the new face region and extending in a positive axial direction of the first reference axis, as a search region. Note that the body region detection section 36 enlarges the search region in a direction perpendicular to the first reference axis. An example of the search region is shown in FIG. 10(*a*). In this example, a new face region 220 and a new face frame 310 are depicted in a connection judgment image 110, and the roll direction of the new face region faces the front. Further, the tracking target determination section 35 sets a vertically long search region 440 to a direction downward of the new face region 220.

Next, the tracking target determination section 35 adjusts the shape of the tracking face region, based on the size of the tracking face region, generation information, and gender information. The specific process contents are similar to those of step S200 described above.

In step S370, the tracking target determination section 35 judges whether or not the roll direction of the tracking face region inclines to the left. The specific process contents are similar to those of step S210. In the case where it is judged that the roll direction of the tracking face region inclines to the left, the tracking target determination section 35 proceeds to step S380, and in the case where it is judged that the roll direction of the tracking face region inclines to the right, the tracking target determination section 35 proceeds to step S390.

In step S380, the tracking target determination section 35 sets a region, adjacent to the neck part of the tracking face region and extending in a positive axial direction of the first reference axis, as the search region. Note that the body region detection section 36 enlarges the search region in a direction perpendicular to the first reference axis. An example of the search region is shown in FIG. 10(b). In this example, the new face region 220 and the new face frame 310 are depicted in the connection judgment image 110, and the roll direction of the new face region inclines to the left. Further, the tracking target determination section 35 sets a horizontally long search region 440 to a direction to the right of the new face region 220. Next, the tracking target determination section 35 adjusts the shape of the new face region, based on the size of the new face region, generation information, and gender information. Thereafter, the tracking target determination section 35 proceeds to step S400.

In step S390, the tracking target determination section 35 sets a region, adjacent to the neck part of the new face region and extending in a positive axial direction of the first reference axis, as the search region. Note that the body region detection section 36 enlarges the search region in a direction perpendicular to the first reference axis. Further, in the case where the process of step S390 is performed, the roll direction of the new face region inclines to the right. An example of the search region is shown in FIG. 10(c). In this example, the new face region 220 and the new face frame 310 are depicted in the connection judgment image 110, and the roll direction of the new face region inclines to the right. Further, the tracking target determination section 35 sets a horizontally long search region 440 to a direction to the left of the new face region 220. Next, the body region detection section 36 adjusts the shape of the new face region, based on the size of the new face region, generation information, and gender information. Thereafter, the body region detection section 36 proceeds to step S400.

In step S400, the tracking target determination section 35 judges whether or not the yaw direction of the new face region faces the front. The specific process contents are similar to those of step S240. In the case where it is judged that the yaw direction of the new face region faces the front, the tracking target determination section 35 proceeds to step S480, and in the case where it is judged that the yaw direction of the new face region is a direction other than that which faces the front, the tracking target determination section 35 proceeds to step S410.

In step S410, the tracking target determination section 35 judges whether or not the yaw direction of the new face region inclines to the left. The specific process contents are similar to those of step S250. In the case where it is judged that the yaw direction of the new face region inclines to the left, the tracking target determination section 35 proceeds to step S420, and in the case where it is judged that the yaw direction of the new face region inclines to the right, the tracking target determination section 35 proceeds to step S450.

In step S420, the tracking target determination section 35 judges whether or not the rotation in the yaw direction of the new face region is small. The specific process contents are similar to those of step S260. In the case where it is judged that the rotation in the yaw direction of the new face region is small, the tracking target determination section 35 proceeds to step S430. On the other hand, in the case where it is judged that the rotation in the yaw direction of the new face region is large, the tracking target determination section 35 proceeds to step S440.

In step S430, the tracking target determination section 35 moves the search region slightly in the direction opposite to the rotation direction of the second reference axis. The specific process contents are similar to those of step S270. Thereafter, the tracking target determination section 35 proceeds to step S480.

In step S440, the tracking target determination section 35 moves the search region considerably in the direction opposite to the rotation direction of the second reference axis. The specific process contents are similar to those of step S280. Thereafter, the tracking target determination section 35 proceeds to step S480.

In step S450, the tracking target determination section 35 judges whether or not the rotation in the yaw direction of the new face region is small. The specific process contents are similar to those of step S290. In the case where it is judged that the rotation in the yaw direction of the new face region is small, the tracking target determination section 35 proceeds to step S460. On the other hand, in the case where it is judged that the rotation in the yaw direction of the new face region is large, the tracking target determination section 35 proceeds to step S470.

In step S460, the tracking target determination section 35 moves the search region slightly in the direction opposite to the rotation direction of the second reference axis. The specific process contents are similar to those of step S300. Thereafter, the tracking target determination section 35 proceeds to step S480.

In step S470, the tracking target determination section 35 moves the search region considerably in the direction opposite to the rotation direction of the second reference axis. The specific process contents are similar to those of step S310. Thereafter, the tracking target determination section 35 proceeds to step S480.

In step S480, the tracking target determination section 35 judges whether or not the center of gravity of the body tracking frame is present within the search region. An example is shown in FIG. 10(a) in which the center of gravity of the body tracking frame is present within the search region. In the example shown in FIG. 10(a), a body tracking frame 420 and a center of gravity 430 are superimposed onto the connection judgment image 110, and the center of gravity 430 is present within the search region 440. Similarly, an example is shown in FIG. 10(d) in which the center of gravity of the body tracking frame is present outside the search region. In the example shown in FIG. 10(d), the body tracking frame 420 and the center of gravity 430 are superimposed onto the connection judgment image 110, and the center of gravity 430 is present outside the search region 440.

In the case where it is judged that the center of gravity of the body tracking frame is present within the search region, the tracking target determination section 35 proceeds to step S490, and in the case where it is judged that the center of gravity of the body tracking frame is present outside the search region, the tracking target determination section 35 proceeds to step S500.

In step S490, the tracking target determination section 35 judges that the new face region and the tracking body region have the above described prescribed position relation, and connects them. Thereafter, the tracking target determination section 35 ends the connection judgment process. On the other hand, in step S500, the tracking target determination section 35 judges that the new face region and the tracking body region do not have the prescribed position relation, and does not connect them. Thereafter, the tracking target determination section 35 ends the connection judgment process.

Note that the tracking target determination section 35 may set the search region by using movement information (movement vectors) of the region surrounding the new face region, and information other than the picked-up image (for example, infrared information, distance information, thermograph information, or the like), simultaneously. The specific process contents are similar to those of the body region detection process.

(Next-Occasion Tracking Target Judgment Process)

Next, the next-occasion tracking target judgment process, based on FIG. 6, will be described. In step S510, the tracking target determination section 35 judges whether or not the body region is the tracking target. Note that the tracking target is determined by the tracking target determination process, which is shown in FIG. 3. In the case where the body region is the tracking target, the tracking target determination section 35 proceeds to step S520, and in the case where the face region is the tracking target, the tracking target determination section proceeds to step S530.

In step S520, the tracking target determination section 35 starts the body tracking section 34. Specifically, the tracking target determination section 35 starts the start indication information in the body tracking section 34. In this way, the body tracking process begins from the next frame. Thereafter, the tracking target determination section 35 ends the next-occasion tracking target judgment process.

In step S530, the tracking target determination section 35 judges whether or not the reliability of the tracking face region is equal to or below a prescribed value. In the case where it is judged that the reliability of the tracking face region is equal to or below the prescribed value, the tracking target determination section 35 proceeds to step S520, and in the case where the reliability of the tracking face region exceeds the prescribed value, the tracking target determination section 35 proceeds to step S540. Therefore, even if there are cases where the tracking target is the face region, in the case where the reliability of the face region is low, the tracking target determination section 35 performs face tracking and body tracking in parallel. The reliability of the tracking face region becomes smaller as the absolute value of the rotation angle of the yaw direction of the tracking face region gets larger. In step S540, the tracking target determination section 35 does not start the body tracking section 34. Thereafter, the tracking target determination section 35 ends the next-occasion tracking target judgment process.

In this way, the living body tracking section 30 assumes that the tracking target is in principle the face region. That is, in the case where the tracking face region has been detected by the collation process of the current frame, the living body tracking section 30 assumes that the tracking target is the face region. In addition, in the case where the tracking face region has been detected by the face tracking process of the current frame, the living body tracking section 30 assumes that the tracking target is the face region. In addition, even if the tracking target is the body region, in the case where the new face region and the tracking body region are connected, the living body tracking section 30 changes the tracking target to the face region.

However, in the case where the tracking face region is not detected in the current frame, and the new face region is not connected with the tracking body region, the living body tracking section 30 assumes that the tracking target is the body region. Then, in the case where the tracking target becomes the body region, or in the case where the reliability of the tracking face region is low, the living body tracking section 30 begins the body tracking process in the next frame. That is, in the case where the reliability of the tracking face region detected in the current frame is low, the living body tracking section 30 performs the face tracking process and the body tracking process in parallel in the next frame. For example, robustness for environmental change, which is higher for the face tracking process than for the body tracking process, is included as a reason why the living body tracking section 30 assumes that the tracking target is in principle the face region.

Further, the living body tracking section 30 normally detects the tracking body region during the face tracking process. In this way, the living body tracking section 30 can normally recognize the latest (that is, corresponding to the present environment) tracking body region.

(Process by the Display Control Section)

Next, an example of an image which the display control section 38 displays on the display section 40 will be described. The display control section 38 generates a display image 120 by combining the images given by each configuration, and displays this on the display section 40. FIGS. 11(a)-(d) and 12(a)-(d) are examples of the display image 120. In the case where the tracking target of the current frame is the face region, the display control section 38 displays the display image 120, which is shown in FIG. 11(a), for example, on the display section 40.

A person image 200, the tracking face region 210, and the face tracking frame 300 are depicted in this display image 120. The person image 200 is facing the front with respect to the lens 10. Note that the body region detection section 36 detects the tracking body region 400 in parallel with the process by the display control section 38.

Thereafter, when the yaw direction of the person image 200 changes, the reliability of the tracking face region 210 decreases. However, in the case where the reliability of the tracking face region 210 is high, the tracking target is left as the face region, and the body tracking section 34 does not start. Therefore, the display control section 38 displays the display image 120, as shown in FIG. 11(b), in the same way as that of FIG. 11(a).

Thereafter, in the case where the reliability of the tracking face region is equal to or below the prescribed value, the tracking target is left as the face region, but the body tracking section 34 starts. In this case, the face tracking frame superimposed image and the body tracking frame superimposed image are given to the display control section 38. Accordingly, the display control section 38 displays a combination of these images, as shown in FIG. 11(c), as the display image 120, on the display section 40. The face tracking frame 300 and the body tracking frame 420 are both depicted in the display image 120.

Thereafter, when the tracking face region is no longer detected, the face frame superimposed image and the body tracking frame superimposed image are given to the display control section 38. Accordingly, the display control section 38 displays a combination of these images, as shown in FIG. 11(d), as the display image 120, on the display section 40. However, since the face region is not detected, the face region is not depicted in the display image 120. Note that even in this case, the face detection section 32 and the face collation section 33 continue to start.

In the state where the new face region is not detected, the display control section 38 displays a similar image (refer to FIGS. 11(e)-12(a), 12(b)). In this way, the user can easily understand both the present tracking target and the timing in which the tracking target is switched.

Thereafter, when a new face region is detected, a new face frame is included in the face frame superimposed image. In this case, the display control section 38 displays the display image 120, which is shown in FIG. 12(c), on the display section 40. The new face region 220 and the new face frame 310 are depicted in this display image 120. On the other hand, the tracking target determination section 35 performs the connection judgment process in parallel with the process by the display control section 38. In the example shown in FIG. 12(c), since the new face region 220 and the body tracking frame 420 have the prescribed position relation, the new face region 220 is assumed to be the tracking face region 210, and the new face frame 310 is assumed to be the face tracking frame 300. In addition, the body tracking section 34 stops. Therefore, the display control section 38 displays the display image 120, shown in FIG. 12(d), in the next frame. The tracking face region 210 and the face tracking frame 300 are depicted in this display image 120.

4. Effect by the Image Processing Apparatus

Next, some examples of the effect by the image processing apparatus 1 will be described. FIGS. 13(a)-(c) show examples of the display image 120 displayed on the display section 40. The person image 200 and a dog image 500 are depicted in these display images 120. Further, a body tracking frame 600 is superimposed onto a body region of the dog image 500. That is, the dog image 500 is the tracking target. On the other hand, the face region of the person image 200 is a normal face region 230, that is, a face region also detected in the previous frame. Therefore, the face frame 320 is superimposed onto the normal face region 230. That is, the face detection section 32 and the face collation section 33 continuously perform a face detection process and a face collation process by the target tracking section 34 tracking the dog image 500, which is the tracking target. Therefore, even during tracking of the dog image 500, the image pickup section 20 can perform a white balance adjustment according to the face region of the person image 200, based on the display image 120. Further, the image pickup section 20 can match the focus to the dog image 500, based on the display image 120, and can adjust the exposure to the face region to an appropriate value.

In the case where the person image 200 and the dog image 500 are separated, as shown in FIG. 13(a), they are naturally not connected. However, when they are close to one another, as shown in FIG. 13(b), there are cases where the position relation of the face region 230 and the tracking body region becomes the prescribed position relation. However, the target of the connection judgment process is not limited to the new face region. Therefore, as shown in FIG. 13(c), they are not connected, and as a result, the face region 230 is not assumed to be the tracking target. In this way, the image processing apparatus 1 can prevent the tracking target from moving to a different photographic subject.

Similarly, FIGS. 14(a)-(b) are examples of the display image 120. As shown in FIG. 14(a), person images 200 and 200a-200c are depicted in the display images 120. The face region of the person image 200 is the tracking target among these person images. Therefore, the face region of the person image 200 is the tracking face region 210. On the other hand, the face regions of the other person images 200a-200c are normal face regions, and face frames 320a-320c are superimposed onto them, respectively.

Thereafter, as shown in FIG. 14(b), when the face region of the person image 200 is no longer detected, the tracking target moves to the body region of the person image 200. That is, the tracking body frame 420 is superimposed onto the body region of the person image 200. On the other hand, in this example, since the face regions of the person images 200a-200c are detected, face frames 320a-320c are superimposed onto them. Therefore, even if there are cases where the face region of the person image is no longer detected, the image pickup section 20 can perform a white balance adjustment according to the face region of the person image 200, based on the display image 120. In addition, the image pickup section 20 can adjust the exposure to the face region to an appropriate value, based on the display image 120.

Similarly, FIGS. 15(a)-(d) are examples of the display image 120. The person image 200 and the dog image 500 are depicted in these display images 120. Further, the face region of the person image 200 is the tracking face region 210, and the face tracking frame 300 is superimposed onto the tracking face region 210. Therefore, the tracking face region 210 is registered in the face region list.

In the case where the tracking face region 210 and the dog image 500 have the prescribed position relation, as shown in FIG. 15(a), there are case where the dog image 500 is detected as the tracking body region 400. Therefore, as shown in FIG. 15(b), when the person moves outside the image pickup range of the image processing apparatus 1, there are cases where the dog image 500 is assumed to be the tracking body region, and the body tracking frame 420 is superimposed onto the dog image 500.

Thereafter, when the person image 200 returns into the display image 120 in a certain frame, as shown in FIG. 15(c), the face region of the person image 200 is assumed to be the new face region 220. In addition, the new face frame 310 is superimposed onto the new face region 220. Note that in this example, since the new face region 220 and the dog image 500 are separated, they are not connected. However, since the new face region 220 has already been registered in the face region list, the new face region 220 is assumed to be the tracking face region 210 in the face collation process, and the face tracking frame 300 is superimposed onto the tracking face region 210. Therefore, as shown in FIG. 15(d), the tracking target returns to the face region of the person image 200. In this way, even if the tracking target moves to a different photographic subject in a certain frame, the image processing apparatus 1 can return the tracking target to the original photographic subject.

Similarly, FIGS. 16(a)-(d) are examples of the display image 120. The person image 200 is depicted in these display images 120. In the display image 120, which is shown in FIG. 16(a), the person image 200 is tracked. However, since the face region is not detected, the body region is assumed to be the tracking target. Therefore, the body tracking frame 420 is superimposed onto the body region of the person image 200.

Thereafter, when the person approaches the image processing apparatus 1 (moves in the direction of arrow A1), as shown in FIG. 16(b), the face region of the person image 200 will be detected. In this way, the tracking target is changed to the face region. That is, the face region of the person image 200 is assumed to be the tracking face region 210, and the face tracking frame 300 is superimposed onto the tracking face region 210. In addition, the tracking face region 210 is registered in the face region list.

Thereafter, when the person moves outside the image pickup range of the image processing apparatus 1 (moves in the direction of arrow A2), as shown in FIG. 16(c), the person image 200 disappears from the display image 120 (frame out), and the tracking is interrupted.

Thereafter, when the person moves in the direction of arrow A3 from outside the image pickup range of the image processing apparatus 1, and enters into the image pickup range of the image processing apparatus 1, first the face region of the person image 200 is assumed to be a new face region in the collation process. In addition, since the face region of the person image 200 has already been registered in the face region list, the new face region is assumed to be the tracking face region 210, and the face tracking frame 300 is superimposed onto the tracking face region 210. Therefore, as shown in FIG. 16(d), the tracking target returns to the face region of the person image 200. In this way, even if the tracking target is framed out at a certain timing, the image processing apparatus 1 can immediately track this tracking target when the tracking target returns into the image pickup range.

Note that in the technology which tracks only the body region of the person image, it may not be possible to register the face region of the person. Therefore, in this technology, when the tracking target is temporarily framed out, it may not be possible to still track only the body region, even if the tracking target returns into the image pickup range. Then, the tracking of the body region has a low robustness for environmental change. Therefore, in the technology which tracks only the body region of the person image, when the tracking target is temporarily framed out, there are often cases where tracking is not able to be returned. On the other hand, even if the tracking target is framed out at a certain timing, the image processing apparatus 1 can immediately track this tracking target when the tracking target returns into the image pickup range.

5. Various Modified Examples

Next, various modified examples of the processes which the image processing apparatus 1 performs will be described.

First Modified Example

As described above, in the case where a new face region is detected and the new face region and the tracking body region have the prescribed position relation, the tracking target determination section 35 assumes that the new face region is the tracking face region. However, even if there are cases where a new face region is detected and the new face region and the tracking body region have the prescribed position relation, the tracking target determination section 35 may continue tracking of the body region.

An example of the process by the first modified example will be described based on FIGS. 17(a)-(d). FIGS. 17(a)-(d) show examples of the display image 120 which is displayed on the display section 40 in the first modified example. FIGS. 17(a)-(c) are similar to those of FIGS. 12(a)-(c). That is, the tracking target determination section 35 performs the above described tracking target determination process, until a new face region is detected.

However, as shown in FIG. 17(c), even if there are cases where the new face region 220 is detected and the new face region 220 and the tracking body region have the prescribed position relation, the tracking target determination section 35 may not assume that the new face region 220 is the tracking face region. Specifically, the tracking target determination section 35 may not perform the connection judgment process. Therefore, in the next frame, the face collation section 33 assumes that the new face region 220 of the previous frame is the normal face frame 230, and superimposes the face frame 320 onto the normal face frame 230. Therefore, as shown in FIG. 17(d), the display control section 38 displays the display image 120, in which the normal face region 230, the face frame 320 and the body tracking frame 420 are depicted.

According to the first modified example, the image processing apparatus 1 can accurately and continuously track parts other than the face region, such as an animal, a vehicle, or the body region of a person. Note that it is assumed that whether or not the image processing apparatus 1 performs the connection judgment process to the new face region is enabled by the setting of the user. In this way, the image processing apparatus 1 can respond to the needs of various users.

Second Modified Example

Next, a second modified example will be described. In the second modified example, the face collating region 33 sets one of the face regions to a smile tracking face region, by an input operation or the like of the user. Then, the face collation section 33 superimposes a smile face tracking frame onto the smile tracking face region. In the case where the smile tracking face region is a smiling face, the face collation section 33 reports this to the image pickup section 20, and the image pickup section 20 performs image pickup when this report is received. Note that it is preferable that the smile face tracking frame is displayed in a mode different from that of the face tracking frame.

In addition, the body region detection section 36 detects a region, which has the prescribed position relation with the smile tracking face region, as a smile tracking body region. Then, the body tracking section 34 superimposes a smile body tracking frame onto the smile tracking body region. Further, in the case where the smile tracking body region has the prescribed position relation with the new face region, the tracking target determination section 35 assumes that the new face region is the smile tracking face region. Note that the tracking target determination section 35 may easily change the tracking target to the face region, by enlarging the search region.

An example of the process by the second modified example will be described based on FIGS. 18(a)-(b). FIGS. 18(a)-(b) are examples of the display image 120 which is displayed on the display section 40 in the second modified example. As shown in FIG. 18(a), the person images 200 and 200a-200c are depicted in the display image 120. The face region of the person image 200 is a smile tracking face region 240 from among these person images, and a smile tracking frame 350 is superimposed onto the smile tracking face region 240. On the other hand, the face regions of the other person images 200a-200c are normal face regions, and face frames 320a-320c are superimposed onto them.

Thereafter, as shown in FIG. 18(b), when the face region of the person image 200 is no longer detected, the tracking target moves to the body region of the person image 200. Here, the body region of the person image 200 is assumed to be the smile tracking body region, and the smile body tracking frame 450 is superimposed onto the smile tracking body region. Thereafter, in the case where the face region of the person image 200 is detected again, this face region, that is, a new face region, is assumed to be the smile tracking face region 240, and the smile tracking frame 350 is superimposed onto the smile tracking face region 240.

In this way, even if this face region is temporarily not detected after a certain face region has been set as the smile tracking face region, the image processing apparatus 1 can prevent other face regions from being set as the smile tracking face region. Accordingly, even if a face region other than the face region, which the user has specified, is a smiling face, the image processing apparatus 1 is able to not perform image pickup.

Note that in the technology which tracks only the face region, when the smile tracking face region is temporarily no longer detected, as shown in FIG. 19, other face regions are assumed to be smile tracking face regions, and smile target face frames 350a-350c are displayed on these face regions. Therefore, in this technology, there are cases where image pickup is performed when a face region other than the face region, which the user has specified, is a smiling face.

Third Modified Example

Next, a third modified example will be described. As described above, in the case where the reliability of the tracking face region is low, the display control section 38 displays both the face tracking frame and the body tracking frame. However, in the third modified example, even if there are cases where the reliability of the tracking face region is low, the display control section 38 displays only the face tracking frame. In this case, in the case where the tracking face frame is no longer detected, the face tracking frame immediately moves to the body tracking frame (in one frame). Needless to say, the face tracking frame may be continuously displayed for a certain time period, so as to prevent hunting.

An example of the process by the third modified example will be described based on FIGS. 20(a)-(b). FIGS. 20(a)-(b) are examples of the display image 120 which is displayed on the display section 40 in the third modified example. The display image 120 shown in FIG. 20(a) is similar to the display image 120 shown in FIG. 11(c), and is an image which is displayed in the case where the reliability of the tracking face region 210 is low. On the other hand, FIG. 20(b) is similar to that of FIG. 11(d), and is an image which is displayed in the case where the tracking face region is no longer detected. In the third modified example as shown in FIG. 20(a), even if the reliability of the tracking face region 210 becomes low, the body tracking frame 420 is not displayed. Even in the third modified example, the user can accurately understand the tracking target.

Fourth Modified Example

Next, a fourth modified example will be described. As described above, in the case where the reliability of the tracking face region is low, the display control section 38 displays both the face tracking frame and the body tracking frame. However, in the fourth modified example, in the case where the reliability of the tracking face region is low, the display control section 38 changes the face region frame in the display image 120 to a transition frame, and does not display the body tracking frame. Then, the display control section 38 moves this transition frame, little by little for each frame, to the position of the body tracking frame. Then, in the case where the position of the transition frame matches the position of the body tracking frame, the display control section 38 changes the transition frame to the body tracking frame. According to the fourth modified example, hunting can be reliably prevented, and the user can accurately understand the tracking target.

An example of the process by the fourth modified example will be described based on FIGS. 21(a)-(c). FIGS. 21(a)-(c) are examples of the display image 120 which is displayed on the display section 40 in the fourth modified example. The display image 120 shown in FIG. 21(a) is similar to the display image 120 shown in FIG. 11(c), and is an image which is displayed in the case where the reliability of the tracking face region 210 is low. On the other hand, FIGS. 21(b) and 21(c) are similar to that of FIG. 11(d), and are images which are displayed in the case where the tracking face region is no longer detected. In the fourth modified example, in the case where the reliability of the tracking face region 210 becomes low, the display control section 38 changes the face tracking frame 300 to a transition frame 700. Then, as shown in FIGS. 21(b) and 21(c), the display control section 38 moves the transition frame 700, little by little for each frame, to the position of the body tracking frame.

Fifth Modified Example

Next, a fifth modified example will be described. In the fifth modified example, the body tracking section 34 superimposes the face tracking frame onto the tracking body region. Therefore, even if there are cases where the tracking target becomes the body region, the display control section 38 displays the tracking body region on which the face tracking frame has been superimposed.

An example of the process by the fifth modified example will be described based on FIG. 22. FIG. 22 shows a situation similar to that of FIG. 14(b). However, in the fifth modified example, the face tracking frame 300 is superimposed onto the tracking body region of the person image 200. Even in this case, the user can accurately understand the tracking target.

Sixth Modified Example

Next, a sixth modified example will be described. In the sixth modified example, in the case where the tracking target becomes the body region, the face detection section 32 detects a region, which has the prescribed position relation with the tracking body region, as a face estimation region. Then, the face collation section 33 superimposes a face estimation frame onto the face estimation region. On the other hand, the body tracking section 34 does not superimpose the body tracking frame onto the tracking body region. Therefore, even if there are cases where the tracking target becomes the body region, the display control section 38 displays the face estimation region on which the face estimation frame has been superimposed. Note that the face estimation frame may be displayed in a mode (for example, color or shape) similar to that of the face tracking frame, or in another mode.

An example of the process by the sixth modified example will be described based on FIG. 23. FIG. 23 shows a situation similar to that of FIG. 14(b). However, in the sixth modified example, a face estimation frame 360 is superimposed onto the face estimation region of the person image 200. Even in this case, the user can accurately understand the tracking target.

Seventh Modified Example

Next, a seventh modified example will be described. In the seventh modified example, the body tracking section 34 superimposes a human body frame onto the entire body of the tracking body region. Note that even if there are cases where the tracking target becomes the face region, the body tracking section 34 may superimpose this human body frame onto the tracking body region.

An example of the process by the seventh modified example will be described based on FIG. 24. FIG. 24 shows a situation similar to that of FIG. 14(*b*). However, in the seventh modified example, a human body frame 370 is superimposed onto the entire body of the tracking body region of the person image 200.

Eighth Modified Example

Next, an eighth modified example will be described. In the eighth modified example, the body tracking section 34 superimposes the body tracking frame onto the tracking body region in the sixth modified example.

An example of the process by the eighth modified example will be described based on FIG. 25. FIG. 25 shows a situation similar to that of FIG. 14(*b*). However, in the eighth modified example, the face estimation frame 360 is superimposed onto the face estimation region of the human image 200, and the body tracking frame 420 is superimposed onto the tracking body region. Even in this case, the user can accurately understand the tracking target.

6. Conclusion

In this way, the image processing apparatus 1 can appropriately switch the tracking target between the face region and the body region. In this way, even if there are cases where the face region frequently moves vertically and horizontally, and face detection is not stable, and even if there are cases where the environment (luminance, for example) frequently changes, the image processing apparatus 1 can more accurately and continuously track the tracking target. Therefore, it becomes possible for the image processing apparatus 1 to perform changing of the direction and size of the tracking target, and photographic subject tracking which is strong against a change of environment, such as luminance. Further, since the image processing apparatus 1 can decreases the frequency of the tracking being ended by no longer being able to recognize the tracking target, the labor for re-registration of the tracking target by the user can be substantially reduced.

In the example shown in FIGS. 26(*a*)-(*d*), for example, a child is depicted as the person image 200 in the display image 120. Since a child frequently moves, face detection will not be stable. Further, this image performs image pickup in an environment (a sandy beach, for example) in which the luminance frequency changes.

In the case where the face region of the person image 200 can be detected, as shown in FIG. 26(*a*), the image processing apparatus 1 assumes that the face region is the tracking face region 210, and superimposes the face tracking frame 300 onto the tracking face region 210. On the other hand, the image processing apparatus 1 detects a region, which has the prescribed position relation with the tracking face region 210, as the tracking body region. That is, even during tracking of the face region, the image processing apparatus 1 recognizes the latest tracking body region.

Therefore, as shown in FIG. 26(*b*), even if there are cases where the face region of the person image 200 is no longer able to be detected, the image processing apparatus 1 can immediately change the tracking target to the body region, and can superimpose the body tracking frame 420 onto the tracking body region.

Thereafter, in the case where the face region of the person image 200 is detected again, as shown in FIG. 26(*c*), the image processing apparatus 1 assumes that this face region is a new face region. Then, since the new face region has the prescribed position relation with the tracking body region, the image processing apparatus 1 assumes that the new face region is the tracking face region 210, and superimposes the face tracking frame 300 onto the tracking face region 210. Next, on the other hand, the image processing apparatus 1 detects a region, which has the prescribed position relation with the tracking face region 210, as the tracking body region. That is, even during tracking of the face region, the image processing apparatus 1 recognizes the latest tracking body region.

Therefore, as shown in FIG. 26(*d*), even if there are cases where the face region of the person image 200 is no longer able to be detected, the image processing apparatus 1 can immediately change the tracking target to the body region, and can superimpose the body tracking frame 420 onto the tracking body region.

In the present embodiments described above, the image processing apparatus 1 detects a region, which has the prescribed position relation with the face region in the picked-up image, as the body region, and tracks the body region. Therefore, even if there are cases where the face region is not able to be detected, since the image processing apparatus 1 can track the body region, tracking of the person can be performed more reliably.

In addition, since the image processing apparatus 1 detects the body region based on features of the face region, the body region can be more accurately detected.

In addition, since at least one of the direction of the face region, the size of the face region, the position of respective parts within the face region, generation information, and gender information, is included in the features of the face region, the image processing apparatus 1 can more accurately detect the body region.

In addition, since at least one of the roll direction, yaw direction, and pitch direction of the face region is included in the direction of the face region, the image processing apparatus 1 can more accurately detect the body region.

In addition, since the image processing apparatus 1 detects the face region from the picked-up image, determines at least one of the face region and body region as the tracking target, and tracks the tracking target, even if it encounters a case where the face region is not able to be detected, the body region can be tracked.

In addition, in the case where the face region is detected in a past frame, specifically, in the previous frame, the image processing apparatus 1 determines the face region as the tracking target. Therefore, in the case where the face region is detected in the previous frame, that is, in the case where face tracking is possible, the image processing apparatus 1 can continuously perform face tracking.

In addition, in the case where the face region is detected and is tracked in a past frame, that is, in the previous frame, the image processing apparatus 1 determines the face region as the tracking target. Therefore, in the case where the face region is tracked in the previous frame, that is, in the case where face tracking is possible, the image processing apparatus 1 can continuously perform face tracking.

In addition, in the case where the reliability of the face region during tracking of the face region is equal to or below a prescribed value, since the image processing apparatus 1 begins tracking of the body region, a human body can be more accurately and reliably tracked.

In addition, in the case where the face region is detected during tracking of the body region, and the face region and body region have the prescribed position relation, the image processing apparatus 1 determines the face region as the tracking target. Therefore, in the case where the face region, which constitutes the same photographic subject as that of the body region, is detected, the image processing apparatus 1 can immediately re-start face tracking.

In addition, in the case where the face region is not detected in a past frame, that is, in the previous frame, and the face region and body region have the prescribed position relation, the image processing apparatus 1 determines the face region as the tracking target. Therefore, in the case where the body region and the face region constitute separate photographic subjects, and even if their position relation is a temporarily prescribed position relation, the image processing apparatus 1 is able to not move the tracking target to the face region.

In addition, in the case where the picked-up image and the tracking frame showing the tracking target (the face tracking frame or the body tracking frame) are displayed on the display section 40, and the tracking target has been changed, the image processing apparatus 1 shows both the face tracking frame and the body tracking frame. Therefore, the user can more accurately understand the tracking target.

In addition, the image processing apparatus 1 shows the tracking frame in a mode corresponding to the type of tracking target. That is, in the case where the tracking target becomes the face region, the image processing apparatus 1 superimposes the face tracking frame onto the face region, and in the case where the tracking target becomes the body region, the image processing apparatus 1 superimposes the body tracking frame onto the body region. Therefore, the user can more accurately understand the type of tracking target.

In addition, in the case where the picked-up image and the tracking frame are displayed on the display section 40, and the tracking target has been changed, since the image processing apparatus 1 performs a transition of the transition frame from the tracking target prior to the change to the tracking target after the change, hunting can be prevented. Therefore, the user can more accurately understand the tracking target.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing system, comprising: a face detection unit to detect a face in an image; and a partial region detection unit to detect a partial region of the image based on a position of the face detected in the image.

(2) The image processing system of (1), further comprising: a tracking determination unit to select at least one of the face and the partial region for tracking based on a predetermined condition, and to track the selected at least one of the face and the partial region.

(3) The image processing system of any one of (1) and (2), further comprising: a face collation unit to collate at least part of the face detected by the face detection unit with a stored list of face information.

(4) The image processing system of any one of (1) to (3), further comprising: a lens; an image pickup unit to capture the image through the lens; and a display to display the image and to display tracking of the selected at least one of the face and the partial region.

(5) The image processing system according to (2), wherein the predetermined condition includes a reliability of face tracking, the reliability of the face tracking decreasing as a rotation angle of the face increases.

(6) The image processing system of any one of (2) or (5), wherein the tracking determination unit selects the face for tracking when the reliability of face tracking is above a predetermined threshold.

(7) The image processing system of any one of (2), (5) or (6), wherein the tracking determination unit selects the face and the partial region for tracking when the reliability of face tracking is equal to or below the predetermined threshold.

(8) The image processing system of any one of (2), (5), (6) or (7), wherein the tracking determination unit selects the partial region for tracking when the face is not detected.

(9) The image processing system of any one of (1) to (8), wherein the partial region detection unit detects the partial region based on an orientation of the face detected in the image.

(10) The image processing system of any one of (1) to (9), wherein at least a portion of the partial region detected extends below the face when the face is oriented vertically.

(11) The image processing system of any one of (1) to (10), wherein at least a portion of the partial region detected extends to a right side of the face when the face is inclined to a left side.

(12) The image processing system of any one of (1) to (11), wherein at least a portion of the partial region detected extends to a left side of the face when the face is inclined to a right side.

(13) The image processing system of (2), wherein the tracking determination unit switches directly from tracking the face to tracking the partial region based on the predetermined condition.

(14) The image processing system of (7), wherein the face detection unit identifies a face estimation region based on a position of the partial region.

(15) The image processing system of any one of (2) to (14), further comprising: a display unit to display the image, wherein an indication of tracking is superimposed on the image based on the selection of at least one of the face and the partial region.

(16) The image processing system of (15), where the indication includes a box superimposed on the image.

(17) The image processing system of any one of (15) to (16), wherein the indication includes a first box superimposed on the face and a second box superimposed on the partial region when both the face and the partial region are tracked.

(18) The image processing system of any one of (15) to (17), wherein the box is superimposed over both the face and the partial region when both the face and the partial region are tracked.

(19) An image processing method, comprising: detecting, in a face detection unit, a face in an image; and detecting, in a partial region detection unit, a partial region of the image based on a position of the face detected in the image.

(20) A non-transitory computer-readable medium encoded with computer-readable instructions thereon, the computer readable instructions when executed by a computer cause the computer to perform a method comprising: detecting a face in an image; and detecting a partial region of the image based on a position of the face detected in the image.

(21)
An image processing apparatus, including:
a tracking section which detects a partial region of a photographic subject based on a face region in a picked-up image, and tracks the partial region.
(22)
The image processing apparatus according to (21),
wherein the partial region has a prescribed position relation with the face region.
(23)
The image processing apparatus according to (22),
wherein the tracking section detects the face region from the picked-up image, determines at least one of the face region and the partial region as a tracking target, and tracks the tracking target.
(24)
The image processing apparatus according to (23),
wherein the tracking section switches the tracking target between the face region and the partial region.
(25)
The image processing apparatus according to (24),
wherein in the case where the face region is registered in a face region list each time the face region is detected, and the face region of a current frame matches a face region registered in the face region list, the tracking section determines the face region as the tracking target.
(26)
The image processing apparatus according to (24),
wherein in the case where the face region of the current frame matches the face region tracked in a past frame, the tracking section determines the face region as the tracking target.
(27)
The image processing apparatus according to any one of (24) to (26),
wherein in the case where a reliability of the face region during tracking of the face region becomes equal to or below a prescribed value, the tracking section begins tracking of the partial region.
(28)
The image processing apparatus according to any one of (24) to (27),
wherein in the case where the face region is detected during tracking of the partial region, and the face region and the partial region have the prescribed position relation, the tracking section determines the face region as the tracking target.
(29)
The image processing apparatus according to (28),
wherein in the case where the face region is not detected in a past frame, and the face region and the partial region have the prescribed position relation, the tracking section determines the face region as the tracking target.
(30)
The image processing apparatus according to any one of (24) to (29),
wherein in the case where the picked-up image and a tracking target notification image showing the tracking target are displayed on a display section, and the tracking target has been changed, the tracking section displays the tracking target notification image for both the tracking target prior to the change and the tracking target after the change.
(31)
The image processing apparatus according to any one of (24) to (30),
wherein the tracking section displays the picked-up image on a display section, and displays a tracking target notification image showing the tracking target on the display section in a mode corresponding to the type of the tracking target.
(32)
The image processing apparatus according to any one of (24) to (29),
wherein in the case where the picked-up image and a tracking target notification image showing the tracking target are displayed on a display section, and the tracking target has been changed, the tracking section performs a transition of the tracking target notification image from the tracking target prior to the change to the tracking target after the change.
(33)
The image processing apparatus according to any one of (21) to (32),
wherein the tracking section detects the partial region based on features of the face region.
(34)
The image processing apparatus according to (33),
wherein at least one of a direction of the face region, a size of the face region, a movement of the face region, a position of respective parts within the face region, generation information, and gender information is included as the features of the face region.
(35)
The image processing apparatus according to (34),
wherein at least one of a roll direction, a yaw direction, and a pitch direction of the face region is included as the direction of the face region.
(36)
An image processing method including:
detecting a partial region of a photographic subject based on a face region in a picked-up image, and tracking the partial region.
(37)
A program for causing a computer to realize the functions of:
detecting a partial region of a photographic subject based on a face region in a picked-up image, and tracking the partial region.

REFERENCE SIGNS LIST

1 Image processing apparatus
10 Lens
20 Image pickup section
30 Living body tracking section
31 Image memory
32 Face detection section
33 Face collation section
34 Body tracking section
35 Tracking target determination section
36 Body region detection section
37 Feature amount extraction section
38 Display control section
40 Display section
50 External interface

The invention claimed is:
1. An image processing system, comprising:
a processor configured to:
   detect a face region in an image;
   detect a partial region of the image based on the detected face region in the image;
   track the detected face region in the image; and
   set the detected partial region in a direction opposite to a rotation direction of the detected face region.

2. The image processing system according to claim 1, wherein the processor is further configured to:
  select at least one of the detected face region in the image or the detected partial region in the image based on a condition, and
  collate at least a part of the detected face region with stored face information.

3. The image processing system according to claim 2, further comprising:
  a lens;
  an image pickup unit configured to capture the image through the lens; and
  a display unit configured to display the image and to display a track of the selected at least one of the detected face region in the image or the detected partial region of the image.

4. The image processing system according to claim 2, wherein the condition includes a reliability of face tracking information,
  wherein the reliability of the face tracking information decreases as a rotation angle of the detected face region increases.

5. The image processing system according to claim 4, wherein the detected face region is selected based on the reliability of the face tracking information is above a threshold.

6. The image processing system according to claim 5, wherein the detected face region and the detected partial region are selected based on the reliability of the face tracking information is equal to or below the threshold.

7. The image processing system according to claim 6, wherein the detected partial region of the image is selected based on an undetected face region in a frame previous to a current frame of the image.

8. The image processing system according to claim 1, wherein the partial region of the image is detected based on an orientation of a face in the detected face region in the image.

9. The image processing system according to claim 8, wherein at least a portion of the detected partial region extends below the face region based on the face in the detected face region is oriented vertically.

10. The image processing system according to claim 8, wherein at least a portion of the detected partial region extends to a right side of the face region based on the face in the detected face region is inclined to a left side.

11. The image processing system according to claim 8, wherein at least a portion of the detected partial region extends to a left side of the face region based on the face in the detected face region is inclined to a right side.

12. The image processing system according to claim 2, wherein the processor is further configured to switch from a first tracking operation of the detected face region to a second tracking operation of the detected partial region based on the condition.

13. The image processing system according to claim 1, wherein the processor is further configured to identify a face estimation region based on a position of the detected partial region.

14. The image processing system according to claim 1, wherein the processor is further configured to detect the partial region of the image based on a neck part of the detected face region in the image.

15. An image processing method, comprising:
  detecting a face region in an image;
  detecting a partial region of the image based on the detected face region in the image;
  tracking the detected face region in the image; and
  setting the detected partial region in a direction opposite to a rotation direction of the detected face region.

16. A non-transitory computer-readable medium having stored thereon computer-executable instructions that, when executed by a processor, cause a computer to execute operations, the operations comprising:
  detecting a face region in an image; and
  detecting a partial region of the image based on the detected face region in the image;
  tracking the detected face region in the image; and
  setting the detected partial region in a direction opposite to a rotation direction of the detected face region.

* * * * *